United States Patent
Koga et al.

(10) Patent No.: US 8,490,722 B2
(45) Date of Patent: Jul. 23, 2013

(54) RIDING-TYPE GROUND WORKING VEHICLE

(75) Inventors: Kazunari Koga, Hyogo (JP); Hiroaki Hashima, Hyogo (JP)

(73) Assignee: Kanzaki Kokyukoki Mfg. Co., Ltd. (JP)

( * ) Notice: Subject to any disclaimer, the term of this patent is extended or adjusted under 35 U.S.C. 154(b) by 275 days.

(21) Appl. No.: 12/955,208

(22) Filed: Nov. 29, 2010

(65) Prior Publication Data

US 2011/0127093 A1  Jun. 2, 2011

(30) Foreign Application Priority Data

Nov. 30, 2009 (JP) .................................. 2009-271545

(51) Int. Cl.
*B60K 17/30* (2006.01)

(52) U.S. Cl.
USPC ........................................................ 180/6.28

(58) Field of Classification Search
USPC .................. 180/6.5, 6.2, 6.48, 6.24
See application file for complete search history.

(56) References Cited

U.S. PATENT DOCUMENTS

| | | | | |
|---|---|---|---|---|
| 7,017,327 B2 * | 3/2006 | Hunt et al. | ...................... | 56/14.7 |
| 2006/0048976 A1 * | 3/2006 | Deguchi et al. | ................ | 180/6.5 |
| 2009/0260901 A1 * | 10/2009 | Ishii et al. | ....................... | 180/6.5 |
| 2011/0127093 A1 * | 6/2011 | Koga et al. | .................... | 180/6.24 |

FOREIGN PATENT DOCUMENTS

| | | |
|---|---|---|
| JP | 5-49106 A | 2/1993 |
| JP | 5-91607 A | 4/1993 |
| JP | 8-168112 A | 6/1996 |
| JP | 9-30278 A | 2/1997 |
| JP | 10-271613 A | 10/1998 |
| JP | 2005-184911 A | 7/2005 |
| JP | 2006-74974 A | 3/2006 |
| JP | 2006-507789 A | 3/2006 |
| JP | 2006-111038 A | 4/2006 |
| JP | 3853907 B | 9/2006 |
| JP | 2008-168870 A | 7/2008 |
| JP | 2008-168871 A | 7/2008 |
| JP | 2008-265685 A | 11/2008 |
| JP | 2009-255840 A | 11/2009 |
| WO | 2004/057166 A2 | 7/2004 |

OTHER PUBLICATIONS

Extended European Search Report for Application No./Patent No. 10192569.1-1264/2327607 dated Sep. 1, 2011.
Notice of Grounds for Rejection for Patent Application No. 2009-271545, mailed May 7, 2013, with English translation.

* cited by examiner

*Primary Examiner* — Tashiana Adams
(74) *Attorney, Agent, or Firm* — Cantor Colburn LLP

(57) ABSTRACT

A riding-type ground working vehicle includes left and right wheels, a command value calculating section, a yaw rate detecting section that detects a yaw rate of the vehicle, a target yaw rate calculating section, a correction coefficient acquiring section, and a control section. The left and right wheels are independently driven to travel by two respective traction motors. The command value calculating section calculates target rotational speed command values for the two traction motors based on an acceleration instruction and a turn instruction input by a driver. The target yaw rate calculating section calculates a target yaw rate based on the acceleration instruction and the turn instruction. The correction coefficient acquiring section acquires two correction coefficients respectively relating to the two traction motors based on a deviation between the target yaw rate and a yaw rate detection value. The control section corrects the two target rotational speed command values by the two correction coefficients, and controls drive of the two traction motors based on the corrected two target rotational speed command values.

10 Claims, 21 Drawing Sheets

RIDING-TYPE GROUND WORKING VEHICLE

PRIORITY INFORMATION

The present invention claims priority from Japanese Patent Application No. 2009-271545, filed in Japan on Nov. 30, 2009, the entire contents of which are incorporated herein by reference.

BACKGROUND

1. Technical Field

The present invention relates to a riding-type ground working vehicle including left and right wheels that are main drive wheels independently driven to travel by two respective traction motors, steering control wheels that are provided to be separated in a longitudinal direction with respect to the left and right wheels, and a working machine that is driven to perform ground work.

2. Related Art

Ground working vehicles have been conventionally known, including working machines that are driven to perform ground work such as lawn mowing work and tilling. Further, in relation to such ground working vehicles, there are considered electric ground working vehicles, which include left and right wheels that are main drive wheels which are independently driven to travel by respective motors such as electric motors and hydraulic motors, and steering control wheels such as caster wheels.

For example, the working vehicles include a lawn mowing vehicle loaded with a lawnmower as a working machine and capable of self-powered travel, on which a worker rides to perform traveling and mowing operations onboard. This is called a riding lawnmower vehicle. As the lawnmower, there is used, for example, a lawn mower rotary tool or the like.

A riding lawnmower vehicle is used almost exclusively for so-called "off-road" usage in a garden or the like, and moves over the surface of the ground for lawn mowing work.

For example, National Publication of International Patent Application No. 2006-507789 discloses a hybrid power apparatus that has mounted thereon a device that integrates an engine and an electricity generator which connects a rotor to an engine shaft of an internal combustion engine. It is noted that in a lawnmower that is exemplified as a power apparatus, independent electric motors are respectively linked to a plurality of drive wheels so that each drive wheel can be controlled at independently variable speed, thereby allowing smooth performance of starting, stopping, speed changing, direction changing, and turning of the lawnmower. As an example of turning executed by independent speed changes of the drive wheels, there is mentioned an apparatus in which the left and right rear wheels are linked with respective electric motors.

U.S. Pat. No. 7,017,327 discloses, as a hybrid lawnmower, a configuration in which electric power produced by an alternator connected to an engine disposed at the front is used to drive a deck motor for lawnmower blade driving, left and right wheel motors for driving independently controlled left and right rear wheels, and steering motors that steer left and right front wheels over a range of approximately 180 degrees about an axle. In this case, to turn the lawnmower, the speed difference between the left and right rear wheels is calculated based on input from a steering control section to control the wheel motors, and a steering signal is supplied to the steering motors to control the positions of the left and right front wheels. It is noted that, as a result, the lawnmower can be turned without steering the left and right rear wheels. Related art literature that relates to the present invention includes, in addition to the specifications of National Publication of International Patent Application No. 2006-507789 and U.S. Pat. No. 7,017,327, Japanese Patent Laid-Open Publication No. 2005-184911 and Japanese Patent No. 3853907.

In the case of each of the riding lawnmower vehicles described in National Publication of International Patent Application No. 2006-507789 and U.S. Pat. No. 7,017,327, the left and right rear wheels are independently driven by motors, and it is conceivable that when traveling on a sloping surface (e.g., traveling on contour lines across a sloping surface), the force in the direction different from the traveling direction acts on each of the wheels based on the force of gravity. In this case, there is the possibility that the steering control wheels fail to turn in the direction desired by a driver, or that the wheels slide sideways, and it is likely to be difficult for the vehicle to travel in a straight line direction or a turning direction which is the direction desired by the driver. Especially when the steering control wheels are caster wheels which freely rotate around the vertical axis, making the vehicle travel in a desired direction is likely to be more difficult.

In contrast, Japanese Patent Laid-Open Publication No. 2005-184911 describes a wheel-independently-driving electric automobile which independently drives wheels by individual electric motors. In the electric automobile, the output target value of each of the electric motors is calculated based on an accelerator pedal depression amount and a vehicle speed, the target yaw rate is obtained based on a steering angle and a vehicle speed, and the output target value of each of the electric motors is corrected and output so as to eliminate the deviation between the target yaw rate and the detected yaw rate, which is the yaw rate detection value which is the turning angular velocity about the vertical axis passing through the center of gravity of the electric automobile.

Further, Japanese Patent No. 3853907 describes a drive control apparatus which gives an instruction relating to output to each of a plurality of electric motors for driving left and right drive wheels of an electric automobile. The drive control apparatus includes section which temporarily defines an output instruction based on an acceleration or deceleration request, and section which corrects the instruction before it is given to the electric motor, based on a plurality of state quantities including the detected value of the yaw rate of the vehicle body, and the section corrects the torque command so that a positive or negative moment is produced from the lateral acceleration, the yaw rate detection value, and the like in accordance with a positive or negative sign of the indication showing the yaw movement direction of the vehicle. Further, the moment of the vehicle is determined based on the difference between the plurality of state quantities which are fed back and the target state quantity obtained by using the detected value of the steering angle, and the torque is distributed to the left and right drive wheels in accordance with the determined moment of the vehicle.

In each of the configurations described in Japanese Patent Laid-Open Publication No. 2005-184911 and publication of registered Japanese Patent No. 3853907 as mentioned above, there is the possibility a driver can travel in the straight line direction and the turning direction which is the direction desired by the driver when the vehicle travels on the sloping surface, although the vehicle is an electric automobile instead of a riding lawnmower vehicle. However, in these configurations, it is difficult to set independent corrected values for the left and right drive wheels, and it is difficult to freely set the behavioral characteristics of the vehicle; that is, a vehicle speed and the like, at the time of the control operation of correcting the rotational speed instruction for the electric motors based on the deviation between the detected values and the target values of the yaw rate. For example, in the configuration of Japanese Patent Laid-Open Publication No. 2005-184911, the same output target is calculated for each of the electric motors for driving left and right wheels, and the output target is corrected based on the deviation relating to the yaw rate, but the concrete correction method is not described. Further, in the configuration of Japanese Patent No. 3853907, the same output instruction is temporarily defined in each of the electric motors, and the torque instruction is corrected based on the yaw rate detection values and the like, but the yaw rate target value is not obtained, and it is difficult to freely set the behavioral characteristics of the vehicle at the time of control operation based on the deviation between the detected value and the target value of the yaw rate. Further, such a disadvantage is likely to occur similarly in the case of riding-type ground working vehicles having other working machines besides the riding lawnmower vehicle having a lawnmower as described above.

SUMMARY

An advantage of the present invention is to enable a vehicle to travel in a direction desired by a driver even when the vehicle travels on a sloping surface, and to make it easy to freely set behavioral characteristics of the vehicle at a time of control operation based on a deviation between a detected value and a target value of a yaw rate, in a configuration which individually drives left and right wheels to travel by motors in a riding-type ground working vehicle.

A riding-type ground working vehicle according to the present invention is a riding-type ground working vehicle comprising left and right wheels which are main drive wheels independently driven to travel by two respective traction motors, steering control wheels provided separately in a longitudinal direction with respect to the left and right wheels, and a working machine that is driven to perform ground work, and the riding-type ground working vehicle further comprises command value calculating section that calculates two target rotational speed command values of the two respective traction motors based on an acceleration instruction and a turn instruction input by a driver, yaw rate detecting section that detects a yaw rate of the vehicle, target yaw rate calculating section that calculates a target yaw rate based on the acceleration instruction and the turn instruction, correction coefficient acquiring section that acquires two correction coefficients relating to the two respective traction motors based on a deviation between the target yaw rate and a yaw rate detection value, and control section that corrects the two target rotational speed command values by the two correction coefficients, and controls driving of the two traction motors based on the two corrected target rotational speed command values. In the above described configuration according to the present invention, the traction motors may be hydraulic motors and the like besides the electric motors.

According to the riding-type ground working vehicle according to the present invention, in the configuration in which the left and right wheels can be independently driven to travel by the motors, even when the vehicle travels on a sloping surface, the vehicle is enabled to travel in the direction desired by the driver, and the behavioral characteristics of the vehicle at the time of control operation based on the deviation between the detected value and the target value of the yaw rate can be easily set freely.

Further, in the riding-type ground working vehicle according to the present invention, it is preferable that the two traction motors are electric motors, and the riding-type ground working vehicle further comprises two rotational speed detecting section that detect rotational speeds of the two traction motors, wherein the control section calculates torque command values for the respective traction motors based on a deviation between the two target rotational speed command values after being corrected by the correction coefficients, and rotational speed detection values of the two motors, and controls the driving of the two traction motors by the respective torque command values.

According to the above described configuration, drive of the two traction motors can be controlled with higher precision.

Further, in the riding-type ground working vehicle according to the present invention, it is preferable that the two traction motors are hydraulic motors, and the riding-type ground working vehicle further comprises one or two actuators capable of discharging pressure oil respectively independently to the two traction motors from at least two discharge ports, and capable of changing discharge amounts of the pressure oil discharged from the two discharge ports, and two rotational speed detecting section that detects rotational speeds of the two traction motors, wherein the control section controls the driving of the two traction motors by changing the discharge amounts of the actuator discharged from the two discharge ports, based on a deviation between the two target rotational speed command values after being corrected by the correction coefficients, and rotational speed detection values of the two traction motors.

Further, in the riding-type ground working vehicle according to the present invention, it is preferable that the riding-type ground working vehicle further comprises an actuator power source that drives the actuator, wherein the one or two actuators are actuators that include two control shafts, and two control shaft motors that are operatively connected to the two control shafts, and change rotation angles of the two control shafts, in which the rotational angles of the two control shafts are changed, and thereby, the discharge amounts of the pressure oil discharged from the two discharge ports corresponding to the two respective control shafts change, and the control section calculates rotation angle command values for the two control shafts based on a deviation between the two target rotational speed command values after being corrected by the correction coefficients, and the rotational speed detection values of the two traction motors, controls the drive of the two control shaft motors by the respective rotation angle command values, and thereby, controls the drive of the two traction motors.

According to the above described configuration, drive of the two traction motors can be controlled with higher precision.

Further, in the riding-type ground working vehicle according to the present invention, it is preferable that the correction coefficient acquiring section includes a calculation section that performs calculation including PI calculation based on a deviation between the target yaw rate and the yaw rate detection value, and a main correction coefficient acquiring section that acquires two correction coefficients corresponding to the two target rotational speed command values from output of the calculation section, and the main correction coefficient acquiring section sets one correction coefficient, of the two correction coefficients, at a fixed value, and decreases or increases the other correction coefficient when the output of the calculation section increases, and sets the other correction coefficient, of the two correction coefficients, at a fixed value, and decreases or increases the one correction coefficient when the output of the calculation section decreases.

According to the above described configuration, the behavioralial characteristics of the vehicle at the time of control operation based on the yaw rate detection value can be easily set.

Further, in the riding-type ground working vehicle according to the present invention, it is preferable that the correction coefficient acquiring section includes a calculation section that performs calculation including PI calculation based on a deviation between the target yaw rate and the yaw rate detection value, and a main correction coefficient acquiring section that acquires two correction coefficients corresponding to the two target rotational speed command values from output of the calculation section, and the main correction coefficient acquiring section sets one correction coefficient, of the two correction coefficients, at a fixed value which is a positive value, and decreases the other correction coefficient when the output of the calculation section increases, and sets the other correction coefficient, of the two correction coefficients, at a fixed value which is a positive value, and decreases the one correction coefficient when the output of the calculation section decreases, and further, changes the correction coefficient corresponding to one traction motor to a negative value from the positive value so as to generate drive torque in a reverse direction with respect to normal rotation corresponding to a traveling direction in the one traction motor, of the two traction motors, when an absolute value of the output of the calculation section is a predetermined value or more.

According to the above described configuration, when the absolute value of the output from the calculation section is a predetermined value or more, torque in the reversing direction with respect to the normal rotation corresponding to the traveling direction is applied to the traction motor at one side of the two traction motors. Therefore, even when the deviation between the target yaw rate and the yaw rate detection value is large, the deviation is quickly eliminated, and stable traveling is easily realized.

Further, in the riding-type ground working vehicle according to the present invention, it is preferable that the riding-type ground working vehicle comprises a pedal that is an acceleration operator capable of receiving an acceleration instruction, and a steering wheel that is a turn operator capable of receiving a turn instruction.

Further, in the riding-type ground working vehicle according to the present invention, it is preferable that the riding-type ground working vehicle comprises a two-lever-type operator capable of receiving the rotational speeds of the two traction motors corresponding to the left and right wheels as an acceleration instruction and a turn instruction, wherein the two-lever-type operator is capable of receiving an acceleration instruction and a turn instruction in concert with each other.

Further, in the riding-type ground working vehicle according to the present invention, it is preferable that the steering control wheel is a caster wheel, or a mechanical steering type steering control wheel that is operatively connected to an operator, and can be steered by being linked to an operation of the operator.

Further, in the riding-type ground working vehicle according to the present invention, it is preferable that the riding-type ground working vehicle comprises a fixed portion that rotatably supports a shaft portion provided at the operator capable of receiving a turn instruction, and is fixed to a vehicle body; a swing arm that is fixed to the shaft portion and swings with rotation of the shaft portion; a loose-fit arm that is loosely fitted on the shaft portion between the swing arm and the fixed portion; a butting mechanism that is provided between the swing arm and the loose-fit arm, makes the swing arm butt against the loose-fit arm to swing the loose-fit arm in the same direction as the swing arm integrally with the swing arm only when a swing amount from a neutral position of the swing arm is a predetermined amount set in advance or more; a first spring that is provided between the swing arm and the loose-fit arm, and gives to the swing arm an urging force, which becomes larger with an increase in the swing amount of the swing arm with respect to the loose-fit arm; and a second spring that is provided between the loose-fit arm and the fixed portion, and gives to the loose-fit arm a second urging force, which becomes larger with an increase of a swing amount of the loose-fit arm with respect to the fixed portion.

According to the above described configuration, the operation force necessary for operating the operator which instructs turn is made large with increase in the operation amount from the neutral position, and the degree of the increase of the operation force with respect to the increase in the operation amount can be increased with a certain operation amount as the boundary, without using complicated control.

As above, according to the riding-type ground working vehicle according to the present invention, in the configuration in which the left and right wheels can be independently driven to travel by the motors, even when the vehicle travels on a sloping surface, the vehicle is enabled to travel in the direction desired by a driver, and the behavioralial characteristics of the vehicle at the time of control operation based on the deviation between the detected value and the target value of the yaw rate can be easily set freely.

DESCRIPTION OF EXEMPLARY EMBODIMENTS

First Embodiment of the Invention

Hereunder, an embodiment according to the present invention will be described in detail by reference to the drawings. In the following description, there is described the case in which a riding-type ground working vehicle is a lawnmower vehicle including a lawnmower as a working machine, but the riding-type ground working vehicle according to the present invention is not limited to this, and the vehicle which performs work for ground; that is, ground work, for example, may be a vehicle having a power tiller, a vehicle having a planting machine, a vehicle having a land leveling machine, a vehicle having an earth drill machine, or the like.

Figure 1:
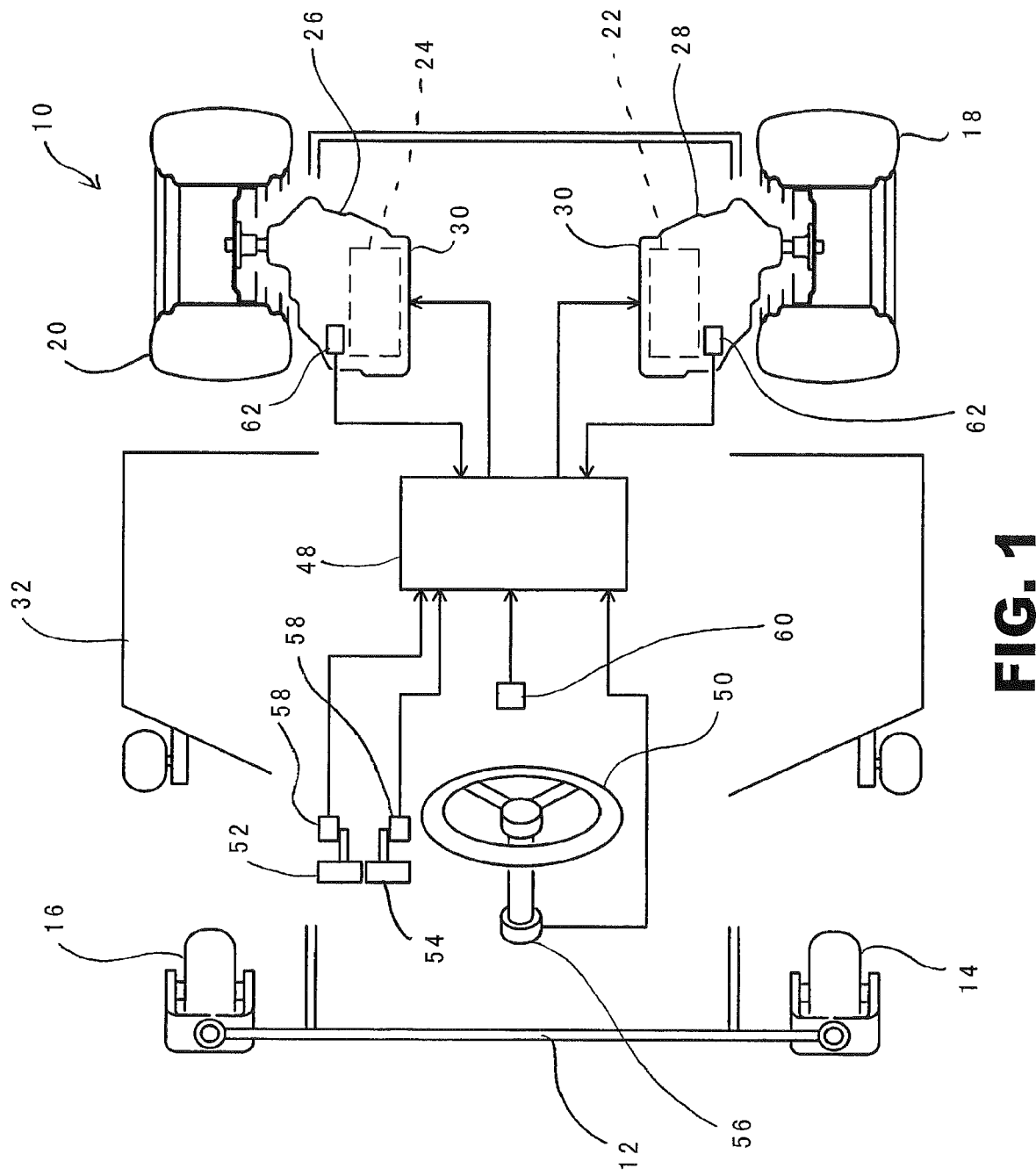
FIG. 1 is a schematic illustration of a configuration of a lawnmower vehicle seen from an upper side, which is a riding-type ground working vehicle of a first embodiment according to the present invention.
Figure 2:
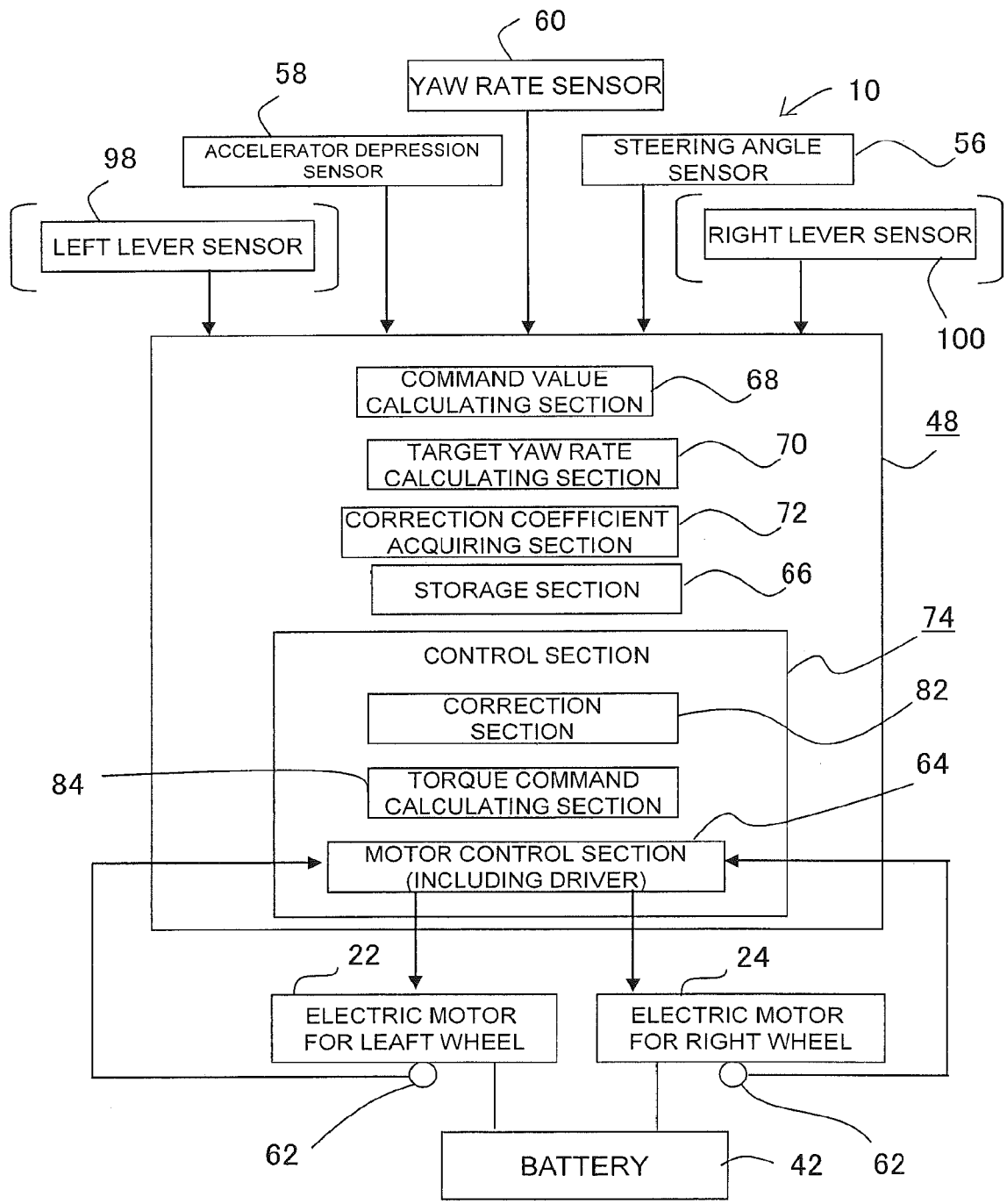
FIG. 2 is a diagram showing the configuration of the lawnmower vehicle of the first and second embodiments.

FIGS. 1 to 10 show a first embodiment of the present invention. FIG. 2 also shows lever sensors 98 and 100 which are components of a second embodiment which is described later in parentheses. As shown in FIG. 1, a lawnmower vehicle 10 which is a riding-type ground working vehicle is a self-powered vehicle for off-road usage suitable for lawn mowing, and has left and right caster wheels 14 and 16, and left and right wheels 18 and 20 provided by being supported at positions separated in the longitudinal direction (lateral direction of FIG. 1) of a main frame 12 which is a vehicle body. The left and right caster wheels 14 and 16 are front side wheels, and are steering control wheels. The two left and right wheels 18 and 20 are rear side wheels, and are main drive wheels. The respective left and right wheels 18 and 20 are independently driven to travel by electric motors 22 and 24 for left and right wheels that are two left and right traction motors. The electric motors 22 and 24 for left and right wheels are provided to be connected to the respective left and right wheels 18 and 20 via a power transmission section including an unillustrated reduction mechanism. By making the rotational speeds of the left and right wheels 18 and 20 correspond to each other by the electric motors 22 and 24 for left and right wheels, straight traveling of the vehicle is enabled, and by generating a rotational speed difference of the left and right wheels 18 and 20, turn traveling of the vehicle is enabled. In this manner, in the present embodiment, the electric motors 22 and 24 for wheels are used as the drive source of the lawnmower vehicle 10. Further, the reduction mechanism provided at the power transmission section uses, for example, a reduction gear system with one speed stage or a plurality of speed stages. In FIG. 1, the electric motors 22 and 24 for wheels and the unillustrated reduction mechanism are respectively provided in housings 30 configuring power generation units 28 and 26 respectively provided at the left and right wheels 18 and 20. Each of the housings 30 is supported by the main frame 12. There may be adopted a configuration which transmits the powers of the electric motors 22 and 24 for wheels to the left and right wheels 18 and 20 without passing through the reduction mechanism and without decelerating the rotational speeds. Further, the caster wheels 14 and 16 are capable of free steering of 360 degrees or more about the axis in the vertical direction (front and back direction of FIG. 1).

Further, the lawnmower vehicle 10 supports a lawnmower (mower) 32, which is a working machine, at the lower side in the intermediate portion in the longitudinal direction of the main frame 12. As shown with reference to FIG. 17 used in an embodiment which is described later, the lawnmower 32 is provided with a lawn mowing blade 36, which is a lawn mowing rotary tool, inside a mower deck 34. The lawn mowing blade 36 has a rotating shaft oriented in the vertical direction (vertical direction of FIG. 17), a plurality of blades are disposed around the rotating shaft, and grass and the like are cut by rotation of the blades and can be mown.

Figure 17:
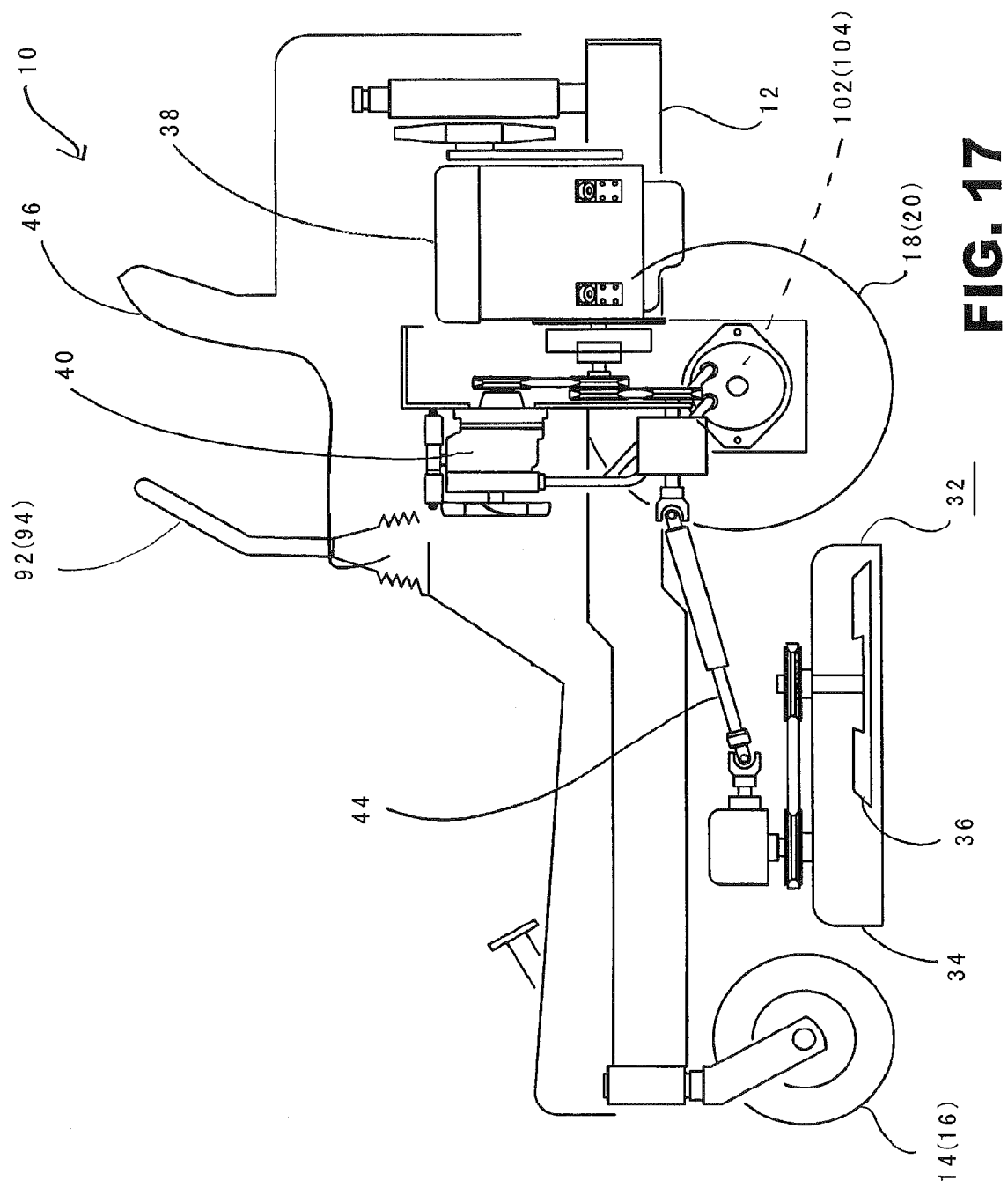
FIG. 17 is a schematic illustration of the vehicle of FIG. 16, seen in the horizontal direction.

Further, as shown with reference to FIG. 17, the lawnmower vehicle 10 is of a so-called hybrid type including an engine 38, a generator 40, and a battery 42 (FIG. 2). The generator 40 is caused to generate electric power by using the power of the engine 38, and the generated electric power can be supplied to the battery 42, which is a power supply unit and is also a secondary battery. Therefore, the engine 38 and the generator 40 are used as the electric power supply source for the battery 42. However, the lawnmower vehicle 10 can be configured to receive supply of charged electric power from the outside without including the engine 38 and the generator 40. As the power supply unit, a battery that has a self-generating function such as a fuel cell, and a solar battery can be used together with the battery which receives supply of the charged electric power from the outside. Further, instead of the battery 42, another storage element such as a capacitor can be used.

As shown with reference to FIG. 17, the power of an output shaft of the engine 38 can be transmitted to the rotating shaft of the lawn mowing blade 36 via a power transmission mechanism 44 including a pulley belt mechanism and a universal joint mechanism. Further, an unillustrated electromagnetic clutch mechanism is provided at the power transmission mechanism 44, and by turning on or off an unillustrated mower switch provided near a seat 46, connection and disconnection of an electromagnetic clutch can be changed. In this case, a signal expressing on or off of the mower switch is transmitted to a controller 48 (FIG. 1) included in the lawnmower vehicle 10, and the controller 48 controls disconnection and connection of the electromagnetic clutch based on the signal. Further, the power transmission mechanism 44 can be provided with a clutch mechanism which can be manually coupled and uncoupled instead of the electromagnetic clutch mechanism.

Further, when the lawnmower vehicle 10 is configured so that the engine 38 and the generator 40 are not included, and the battery 42 receives supply of the charged electric power from the outside, an unillustrated electric motor for mower can be operatively connected to the rotating shaft of the lawn mowing blade 36 (see FIG. 17) to be able to transmit power. In this case, when a signal expressing on or off of the mower switch provided near the seat 46 (see FIG. 17) is input in the controller 48 (FIG. 1), the controller 48 controls the operation state of the electric motor for mower based on the signal. Further, instead of the mower electric motor, a mower hydraulic motor can be used. As above, the lawnmower 32 is driven for performing ground work.

Further, an unillustrated grass-collecting tank can be loaded on the lawnmower vehicle 10, the grass-collecting tank and an end portion of the mower deck 34 (see FIG. 17) can be connected by a duct, and a grass-collecting fan can be provided inside the duct. According to the configuration, the grass which is cut by the lawn mowing blade 36 can be collected in the grass-collecting tank through the duct by drive of the grass-collecting fan.

As the description returns to FIG. 1, the electric motors 22 and 24 for wheels have the function of outputting the rotational driving force to the wheels 18 and 20, when the motors 22 and 24 are supplied with electric power, and may also have the function as a generator which recovers regenerated energy when braking is applied to the wheels. The electric motors 22 and 24 for wheels are, for example, three-phase synchronous electric motors, induction electric motors, or the like.

As the lawn mowing rotary tool which is the lawnmower, there can be used a lawn mowing reel type, which has, for example, a spiral blade disposed at a cylinder having a rotating shaft parallel with the ground surface and clips off grass and the like to mow the lawn and the like, besides the lawn mowing blade type.

As the caster wheels 14 and 16, for example, only one caster wheel can also be provided at the lawnmower vehicle 10, and three or more caster wheels can also be provided, besides two of the caster wheels. Further, in the present embodiment, the left and right wheels 18 and 20 which are the main drive wheels are used as the rear wheels, whereas the caster wheels 14 and 16 are used as the front wheels, but the left and right wheels 18 and 20 which are the main drive wheels can be used as the front wheels, and the caster wheels 14 and 16 can be used as the rear wheels.

The left and right caster wheels 14 and 16 are mounted at the same positions in the longitudinal direction (lateral direction of FIG. 1) at the bottom surface side of the front end portion (left end portion of FIG. 1) of the main frame 12 to be operable. Further, the seat 46 (see FIG. 17) is provided on a top surface side of the intermediate portion in the lateral direction (vertical direction of FIG. 1) at the intermediate portion in the longitudinal direction of the main frame 12. In the present specification, the front side refers to the front side of the vehicle which is at the left side of FIG. 1, and the rear side refers to the rear side of the vehicle which is at the right side of FIG. 1. Further, the left and right wheels 18 and 20 are rotatably supported at the bottom surface side at the positions between the seat 46 and the rear end portion, which are in the same positions with respect to the longitudinal direction of the main frame 12. Further, the lawnmower 32 is disposed between the left and right caster wheels 14 and 16, and the left and right wheels 18 and 20, at the bottom surface side of the main frame 12. The main frame 12 which is formed into a beam structure or the like by using a metal material such as a steel material can be used.

Further, the controller 48 synthetically controls the operation of the electric motors 22 and 24 for wheels. Since the controller 48 is an electric circuit, it can be split up to be disposed at a plurality of locations. In FIG. 1, the controller 48 is shown as one unit. For example, the controller 48 can be intensively disposed at the position which is at the top surface side of the main frame 12 and at the lower side of the seat 46 (see FIG. 17). When the controller 48 is split up to be disposed, the controllers 48 are connected to each other with a signal cable or the like. The controller 48 includes driver circuits such as inverter circuits which drive the electric motors 22 and 24, and a control circuit section such as a CPU, a storage section that serves as a memory, and the like.

At the top surface side of the main frame 12, a steering operator 50, a forward-travel side accelerator pedal 52, a reverse-travel side accelerator pedal 54, and an unillustrated brake pedal are provided, in addition to the seat 46. The steering operator 50 receives a steering angle that is a steering angle as a turn instruction input, detects a steering angle by a steering angle sensor 56, and outputs the detected signal to the controller 48. As the turn operator, a mono-lever type structure also can be used. The forward-travel side accelerator pedal 52 is an acceleration operator for performing the instruction for acceleration in the forward direction, and the reverse-travel side accelerator pedal 54 is an acceleration operator for performing the instruction for acceleration in the reverse direction. In this manner, each of the accelerator pedals 52 and 54 can receive an acceleration instruction.

Further, the steering operator 50 is a turn operator for performing the instruction for turn, and is, for example, a steering wheel in the shape of a circle, an arc, or the like, and has the function of adjusting the turning directions of the left and right wheels 18 and 20 by rotation or swinging. When the steering operator 50 is a steering wheel as in the illustrated example, the steering operator 50 can be rotated at an arbitrary angle in the clockwise direction (right rotation direction) or the counterclockwise direction (left rotation direction) about the rotating shaft thereof. Further, the operation amount of the steering operator 50; that is, the steering angle, is detected by the steering angle sensor 56 as the turn instruction input by a driver, and the signal from the steering angle sensor 56 is transmitted to the controller 48 shown in FIGS. 1 and 2, and the operation of the electric motors 22 and 24 for wheels is controlled. Thus, the steering operator 50 can receive a turn instruction. As the steering angle sensor 56, there can be used a potentiometer, an electric sensor such as an encoder, an optical sensor, or the like. In the following description, "steering angle" expresses the steering direction by a positive or negative sign of its value.

The separate accelerator pedals 52 and 54 are provided for the forward-travel side and the reverse-travel side, but one accelerator pedal can be used for both the forward-travel side and the reverse-travel side. For example, the accelerator pedal can be configured to be supported swingably at a fixed horizontal shaft to be of a swing type capable of being depressed on the front side and the rear side, so as to instruct forward-travel by depressing on the front portion, and instruct reverse-travel by depressing on the rear portion. Each of the accelerator pedals 52 and 54 can be depressed with an arbitrary depression amount. The depression amount on each of the accelerator pedals 52 and 54 is detected by an accelerator depression sensor 58 as an acceleration instruction input by the driver, the signal from the accelerator depression sensor 58 is transmitted to the controller 48 shown in FIGS. 1 and 2, and the operation of the electric motors 22 and 24 for wheels which are connected to the left and right wheels 18 and 20 is controlled. As each of the accelerator depression sensors 58, there can be used a potentiometer, and an electric sensor such as an encoder. The accelerator pedal having the functions of forward-travel and reverse-travel is configured by one accelerator pedal, a switch or a button for selecting any one of forward-travel and reverse-travel is provided, and the function of the one accelerator pedal can be switched to the function of forward-travel and the function of reverse-travel in accordance with the operation state of the switch or the button.

Such a lawnmower vehicle 10 can be accelerated to the forward-travel side or the reverse-travel side by depressing the accelerator pedals 52 and 54. Further, at the operation time or non-operation time of the accelerator pedals 52 and 54, the vehicle can be turned in accordance with the steering direction of the steering operator 50 by steering the steering operator 50. For example, when the steering operator 50 is placed in the neutral position instructing a straight traveling state, and the forward-travel side accelerator pedal 52 is depressed, the wheels 18 and 20 are rotated to the forward-travel side, and as the depression amount becomes larger, the rotational speeds of the wheels 18 and 20 become higher, and the forward-travel speed becomes higher. Instead of this, when the reverse-travel side accelerator pedal 54 is depressed, the wheels 18 and 20 are rotated to the reverse-travel side. As the depression amount becomes larger, the rotational speeds of the wheels 18 and 20 become higher, and the reverse-travel speed becomes higher. Thereby, the lawnmower vehicle 10 can be made to travel forward or in the reverse direction at an arbitrary speed.

Further, when the steering operator 50 is rotated in the clockwise direction; that is, to the right side while the forward-travel side accelerator pedal 52 remains in the state under a proper depression amount, the rotational speed of the left wheel 18 becomes higher than the rotational speed of the right wheel 20, and the lawnmower vehicle 10 can be turned to the right while continuing to travel. When the rotational angle from the neutral position of the steering operator 50 is made large, the difference between the rotational speed of the left wheel 18 and the rotational speed of the right wheel 20 becomes large, whereas the rotational angle from the neutral position of the steering operator 50 is made small, and thereby, the difference between the rotational speeds of the left and right wheels 18 and 20 can be made small. Thereby, the turn radius can be adjusted. When the steering operator 50 is rotated in the counterclockwise direction; that is, to the left side, the rotational speed of the right wheel 20 becomes higher than the rotational sped of the left wheel 18, and the lawnmower vehicle 10 can be turned to the left while continuing to travel.

Further, by changing the depression amount on the forward-travel side accelerator pedal 52, the lawnmower vehicle 10 can be turned while changing the traveling speed. By operating the steering operator 50 while the reverse-travel side accelerator pedal 54 is depressed, turning at the time of reverse-travel can be performed.

Further, in the case of the present embodiment, despite travel on a sloping surface by the lawnmower vehicle 10, the vehicle can be made to travel in the direction desired by the driver. For this purpose, the lawnmower vehicle 10 is provided with a yaw rate sensor 60 serving as yaw rate detecting section which detects a yaw rate that is a turn angular speed about a vertical axis passing through the center of gravity of the vehicle. The detection signal of the yaw rate sensor 60 is transmitted to the controller 48. Further, from the electric motors 22 and 24 for wheels, signals expressing rotational speeds, rotational directions, rotation angles, current values, and the like are fed back to the controller 48 by using various sensors. For example, a rotational speed sensor 62 which serves as rotational speed detecting section is provided at each of the electric motors 22 and 24, and the detection signal of the rotational speed sensor 62 is input into motor control section 64 (FIG. 2) described later which configures the controller 48. A rotation angle sensor can be provided at each of the electric motors 22 and 24 instead of the rotational speed sensor 62, the detection signal of the rotation angle sensor can be input in rotation speed calculating section configuring the controller 48, and the rotational speed of each of the electric motors 22 and 24 can be calculated based on the rotation angle detection value. In this case, the rotational speed detecting section is configured by the rotation angle sensor and the rotational speed calculating section.

Further, the controller 48 controls the output torques of the electric motors 22 and 24 for left and right wheels independently by using the detection signals from such various sensors. For this purpose, the controller 48 calculates the torque command values of the electric motors 22 and 24 for left and right wheels which drive the left and right wheels 18 and 20 respectively, generates the outputs corresponding to the respective torque command values, and generates the drive signals to the driver circuit such as an inverter circuit based on the outputs. Thereby, by using the voltage of the power supply unit, the controller 48 supplies the voltages corresponding to the torque command values to the corresponding electric motors 22 and 24 for wheels, and can control the output torques of the electric motors 22 and 24 for wheels. Next, with use of FIGS. 2 and 3, the configuration and the function of the controller 48 are described in detail. As shown in FIG. 2, the controller 48 has a storage section 66, and the storage section 66 stores a lawnmower vehicle control program.

First, prior to the descriptions of FIGS. 2 and 3, straight traveling and turn traveling of the lawnmower vehicle 10 are described by reference to FIGS. 4, 5A, 5B, and 5C. Hereunder, the description is made by reference to the reference numerals in FIG. 1. In these drawings, the states in a plane view of the caster wheels 14 and 16 and the wheels 18 and 20 in the lawnmower vehicle 10 are schematically shown. In this case, the left and right wheels 18 and 20 are independently driven to travel.

Figure 4:
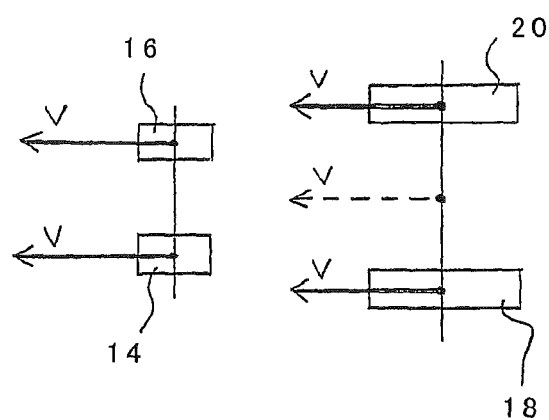
FIG. 4 is a schematic illustration showing a state of straight traveling in the lawnmower vehicle of the first embodiment.
Figure 5A:
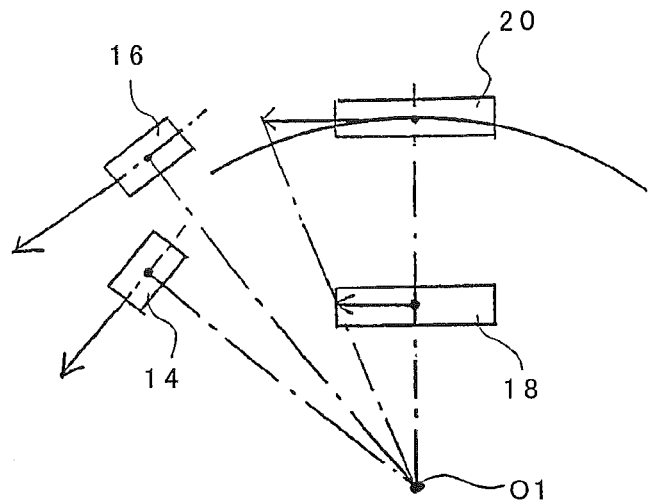
FIG. 5A is a schematic illustration showing a state of turn traveling in the lawnmower vehicle of the first embodiment.
Figure 5B:
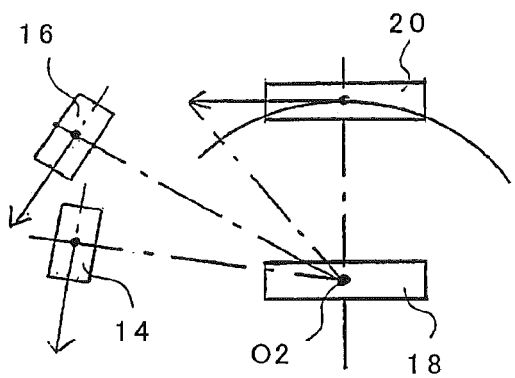
FIG. 5B is a schematic illustration showing the state of turn traveling in the lawnmower vehicle of the first embodiment.
Figure 5C:
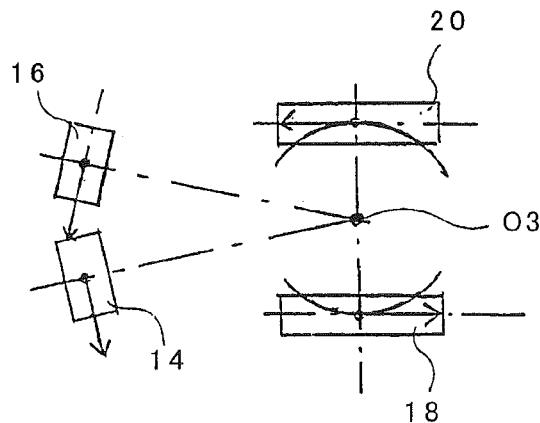
FIG. 5C is a schematic illustration showing the state of turn traveling in the lawnmower vehicle of the first embodiment.

FIG. 4 shows the case of linear traveling, in which the steering operator 50 is kept in the neutral state, and the forward-travel side accelerator pedal 52 is depressed, and all of the caster wheels 14 and 16 and the wheels 18 and 20 travel in the same direction at the same speed to the ground. FIGS. 5A, 5B and 5C show the cases of turn traveling. FIG. 5A shows the case in which a turn center position O1 is located on the outside of the space between the wheels 18 and 20 on an extension in the axle direction of the wheels 18 and 20. FIG. 5B shows the case called a pivot turn in which a turn center position O2 is located at a ground contact position of the one wheel 18 of the wheels 18 and 20. FIG. 5C shows the case called a stationary turn, a spin turn, or zero turn, in which a turn center position O3 is exactly at a central position between both the wheels 18 and 20 on the axle of the wheels 18 and 20, and although the absolute values of the speeds of the wheels 18 and 20 are the same, the rotational direction of the wheel 18 at one side and the rotational direction of the wheel 20 at the other side are in the opposite directions to each other. In this case, the lawnmower vehicle 10 turns by employing the turn center position O3 as the center.

FIGS. 5A, 5B, and 5C each show one example of turn traveling, and turn between the respective examples is performed in some cases. For example, there are the cases in which, although the turn center position is in the inside of the left and right wheels 18 and 20, the turn center position is not in the central position between the left and right wheels 18 and 20, but is instead positioned closer to the side of one of the wheels. The turn traveling in these cases can be realized by adjusting the rotational directions and the rotational speeds of the electric motors 22 and 24 for wheels corresponding to the left and right wheels 18 and 20.

Next, the configuration of the controller 48 and the function of the configuration are described by reference to FIGS. 2 and 3. In the description of FIG. 3, the same components as those in FIG. 1 are described assigned the same reference numerals. As shown in FIG. 2, the controller 48 includes command value calculating section 68, target yaw rate calculating section 70, correction coefficient acquiring section 72, and control section 74. The command value calculating section 68 calculates two target rotational speed command values of the two electric motors 22 and 24 for wheels based on the acceleration instruction and turn instruction input by the driver; that is, the accelerator depression amount and the steering angle, by using the accelerator depression sensor 58 and the steering angle sensor 56. As shown in FIG. 3, the command value calculating section 68 obtains a temporary target rotational speed command value Vr* common to the two electric motors 22 and 24 for wheels corresponding to the accelerator depression amount. For this purpose, for example, the data of the map expressing the relationship between the accelerator depression amount and the temporary target rotational speed command value Vr*, for example, are stored in the storage section 66 (FIG. 2), and the temporary target rotational speed command value Vr* is acquired from the detected accelerator depression amount by referring to the data of the map. Further, in this case, the temporary target rotational speed command value Vr* can also be calculated by simply using the relational expression expressing the relationship between the accelerator depression amount and the temporary target rotational speed command value Vr*, and the detected accelerator depression amount.

Figure 6:
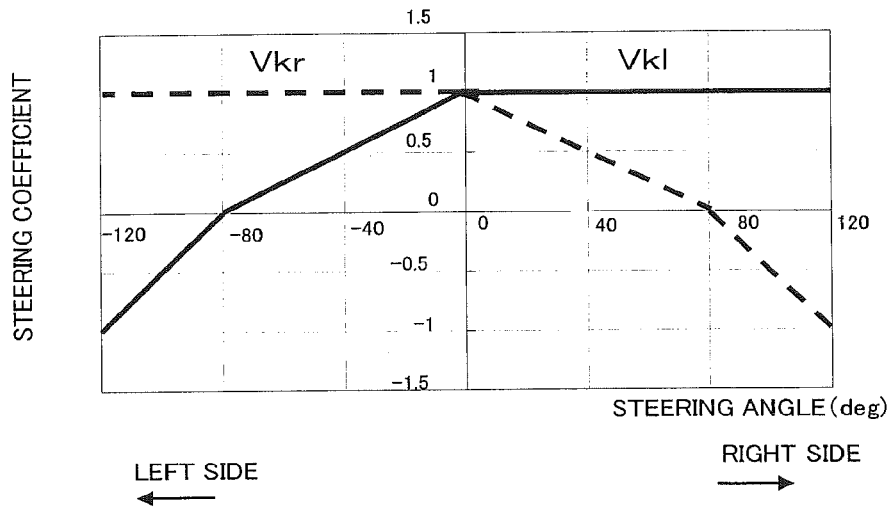
FIG. 6 is a diagram showing a map expressing relationship of a steering angle and a steering coefficient, which is used in a steering characteristic acquiring section shown in FIG. 3.

The command value calculating section 68 has a steering characteristic acquiring section 76, and the steering characteristic acquiring section 76 obtains steering coefficients Vkl and Vkr corresponding to the respective electric motors 22 and 24 for left and right wheels correspondingly to the steering angle of the steering operator 50. The steering coefficients Vkl and Vkr are the ratios (=V2/V1) of the target rotational frequency V2 corresponding to the steering angle to the maximum rotational frequencies V1 in the respective electric motors 22 and 24, and these can translate into the ratios of the target rotational speeds to the maximum rotational speeds. For example, as the steering characteristic, the data of the map expressing the relationship between the steering angle and the steering coefficient are stored in the storage section 66 (FIG. 2). FIG. 6 shows one example of the map.

FIG. 6 expresses the steering angle by the x axis, and expresses that toward the right, the steering operator 50 is rotated to the right side; that is, in the clockwise direction, to a larger degree, and toward the left, the steering operator 50 is rotated to the left side; that is, in the counterclockwise direction, to a larger degree. The steering angle shown in FIG. 6 is positive when it goes toward the right side, and is negative when it goes toward the left side. The y axis of FIG. 6 expresses the steering coefficients Vkl and Vkr. In FIG. 6, a solid line Vkl expresses the relationship between the steering coefficient for left wheel which is multiplied by the temporary target rotational speed command value Vr* of the electric motor 22 for the left wheel, and the steering angle. In FIG. 6, a broken line Vkr expresses the relationship between the steering coefficient for the right wheel which is multiplied by the temporary target rotational speed command value Vr* of the electric motor 24 for the right wheel, and the steering angle.

In the example of FIG. 6, when the steering operator 50 is rotated to the right from the neutral position, the steering coefficient Vkl for left wheel is kept constant, but the steering coefficient Vkr for right wheel gradually reduces linearly. Further, when the steering angle becomes larger than a certain threshold value (80 degrees in FIG. 6), the steering coefficient Vkr for the right wheel becomes a negative value to be smaller. Meanwhile, when the steering operator 50 is rotated to the left from the neutral position, the steering coefficient Vkr for the right wheel is kept constant, but the steering coefficient Vkl for the left wheel gradually reduces linearly. Further, when the steering angle becomes smaller than a certain threshold value (−80 degrees in FIG. 6), the steering coefficient Vkl for the left wheel becomes a negative value to be smaller. In the example of FIG. 6, the slopes with respect to the steering angle when each of the steering coefficients Vkr and Vkl reduces differ between the positive case and the negative case of each of the steering coefficients Vkr and Vkl, but the slopes can be made the same in the positive case and the negative case. In this case, the straight line expressing reduction in the steering coefficients Vkr and Vkl as the absolute value of the steering angle becomes larger has a single line shape in each of the steering coefficients Vkr and Vkl.

Returning to FIGS. 2 and 3, the command value calculating section 68 multiplies the temporary target rotational speed command values Vr* of the electric motor 22 for the left wheel and the electric motor 24 for the right wheel by the steering coefficients Vkr and Vkl thus acquired, and calculates a target rotational speed command value Vrl* for the left wheel 18 and a target rotational speed command value Vrr* for the right wheel 20 respectively. For example, in the case of a steering angle of zero in FIG. 6 in which the steering operator 50 is in the neutral position, 1 is set for each of the steering coefficients Vkr and Vkl, and therefore, the target rotational speed command value Vrl* for the left wheel 18 and the target rotational speed command value Vrr* for the right wheel 20 remain the same target rotational speed command value Vr*. This corresponds to the straight traveling of FIG. 4.

In contrast with this, when the steering angle becomes small; that is, the steering operator 50 is rotated to the left in FIG. 6, only the steering coefficient Vkl for the left wheel becomes smaller than 1, and therefore, only the target rotational speed command value Vrl* of the electric motor 22 for the left wheel becomes smaller than the temporary rotational speed command value Vr*. This corresponds to turning the vehicle to the left in FIG. 5A. As the rotation angle of the steering operator 50 to the left is made larger; that is, as the absolute value of the steering angle is made larger, the steering coefficient Vkl for the left wheel reduces more sharply, and therefore, the turning radius when the vehicle turns to the left tends to be small. Further, when the steering coefficient Vkl for the left wheel further reduces, and becomes zero, the drive torque generated by the electric motor 22 for the left wheel becomes zero. In this case, if the rotational speed of the electric motor 22 for the left wheel actually becomes zero, this corresponds to the pivot turn of FIG. 5B. Further, when, at the time of forward travel, the steering coefficient Vkl for the left wheel further reduces, and becomes a negative value, the target rotational speed command value Vrl* of the electric motor 22 for the left wheel also becomes a negative value, and this corresponds to the case in which torque in the reverse direction is generated in the electric motor 22 for the left wheel. In this case, when the steering coefficient Vkl for the left wheel becomes −1, if the rotational speed of the electric motor 24 for the right wheel and the rotational speed of the electric motor 22 for the left wheel actually have the same value in the opposite directions, this corresponds to the case of the stationary turn of FIG. 5C. In the above description, the case of turning the vehicle to the left is described, but the same thing applies to the case of turning the vehicle to the right except that the left and the right are reversed.

Meanwhile, the target yaw rate calculating section 70 calculates a target yaw rate $\gamma^*$ from the calculated target rotational speed command values Vrl* and Vrr*. That is to say, the target yaw rate calculating section 70 calculates the target yaw rate $\gamma^*$ based on the accelerator depression amount and the steering angle acquired by the accelerator depression sensor 58 and the steering angle sensor 56. More specifically, from the target rotational speed command values Vrl* and Vrr* for the left and right wheels 18 and 20, the reduction ratio by the reduction mechanism, and the radiuses of the left and right wheels 18 and 20, there are obtained the average speed of the vehicle, which is an average ground speed (speed to the ground) of the left and right wheels 18 and 20, and the ground speed difference of the left and right wheels 18 and 20. Further, the target yaw rate $\gamma^*$ is calculated, from the average speed of the vehicle, the ground speed difference of the left and right wheels 18 and 20, and the vehicle specifications such as the length in the longitudinal direction between the axle of the left and right wheels 18 and 20 and the ground contact positions of the left and right caster wheels 14 and 16. In the present embodiment, the yaw rate in the direction of counterclockwise rotation around the vertical axis passing through the center of gravity of the vehicle when the vehicle is seen from above is described as positive, and the yaw rate in the opposite direction is described as negative.

Figure 7:
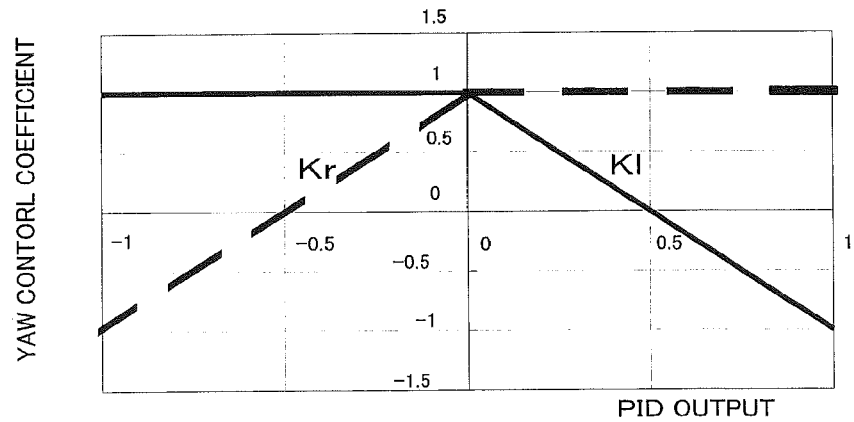
FIG. 7 is a diagram showing a map expressing relationship between PID output and a yaw control coefficient, which is used in a main correction coefficient acquiring section shown in FIG. 3.

Further, the correction coefficient acquiring section 72 acquires two correction coefficients respectively relating to the two electric motors 22 and 24 for wheels based on the deviation between the target yaw rate $\gamma^*$ and the yaw rate detection value $\gamma$ detected by the raw rate sensor 60. For this purpose, the correction coefficient acquiring section 72 includes a PID calculation section 78 which perform PID calculation including PI calculation, and a main correction coefficient acquiring section 80. The PID calculation section 78 receives the deviation between the target yaw rate $\gamma^*$ and the yaw rate detection value $\gamma$ detected by the yaw rate sensor 60, performs PID calculation, and inputs PID output obtained by the calculation into the main correction coefficient acquiring section 80. The main correction coefficient acquiring section 80 acquires yaw control coefficients Kl and Kr, which are two correction coefficients for the left and right wheels 18 and 20 corresponding to the two target rotational speed command values Vrl* and Vrr* for the left and right wheels 18 and 20 from the PID output, and outputs the yaw control coefficients Kl and Kr. The yaw control coefficients Kl and Kr are the ratios (=V2'/V1') of the target rotational frequency V2' corresponding to the PID output to maximum rotational frequencies V1' in the respective electric motors 22 and 24, and this can translate to the ratio of the target rotational speed to the maximum rotational speed. For this purpose, for example, the data of the map expressing the relationship between the PID output and the yaw control coefficients Kl and Kr are stored in the storage section 66 (FIG. 2) as the yaw control characteristics. FIG. 7 shows one example of the map.

FIG. 7 expresses the PID output by the x axis, and expresses that the PID output becomes larger toward the right and the PID output becomes smaller toward the left. The y axis of FIG. 7 expresses the yaw control coefficients Kl and Kr. In FIG. 7, the solid line Kl expresses the relationship between the yaw control coefficient for the left wheel which is multiplied by the target rotational speed command value Vrl* of the electric motor 22 for the left wheel, and the PID output. In FIG. 7, the broken line Kr expresses the relationship between the yaw control coefficient for the right wheel which is multiplied by the target rotational speed command value Vrr* of the electric motor 24 for the right wheel, and the PID output.

In the example of FIG. 7, when the PID output becomes larger than zero, the yaw control coefficient Kr for the right wheel is kept at a constant value which is a positive value, but the yaw control coefficient Kl for the left wheel gradually reduces linearly. Further, when the PID output is larger than a certain threshold value (0.5 in FIG. 7), the yaw control coefficient Kl for the left wheel becomes a negative value and becomes smaller. Meanwhile, when the PID output becomes smaller than zero, the yaw control coefficient Kl for the left wheel is kept at a constant value which is a positive value, but the yaw control coefficient Kr for the right wheel gradually reduces linearly. Further, when the PID output becomes smaller than a certain threshold value (−0.5 degrees in FIG. 7), the yaw control coefficient Kr for the right wheel becomes a negative value to be smaller. More specifically, when the PID output from the PID calculation section 78 increases, the main correction coefficient acquiring section 80 sets one yaw control coefficient of two of the yaw control coefficients Kl and Kr at a constant positive value, and decreases the other yaw control coefficient, whereas when the PID output decreases, the main correction coefficient acquiring section 80 sets the other yaw control coefficient of two of the yaw control coefficients Kl and Kr at a positive constant value, and decreases the one yaw control coefficient.

In the example of FIG. 7, the slope with respect to the PID output when the yaw control coefficient reduces becomes constant irrespective of the signs of the yaw control coefficients Kl and Kr, but the slope with respect to the PID output when each of the yaw control coefficients Kl and Kr reduces can be made to differ when the yaw control coefficients Kl and Kr are positive and negative.

Returning to FIGS. 2 and 3, the main correction coefficient acquiring section 80 outputs the two yaw control coefficients Kl and Kr acquired in accordance with the PID output to correction section 82 included in the control section 74. The control section 74 includes the correction section 82, torque command calculating section 84, and motor control section 64. The correction section 82 corrects the target rotational speed command values Vrl* and Vrr* for the electric motor 22 for the left wheel and the electric motor 24 for the right wheel, which are two target rotational speed command values, by the two corresponding yaw control coefficients Kl and kr, and obtains corrected target rotational speed command values Vrkl* and Vrkr*. More specifically, the correction section 82 multiplies the target rotational speed command values Vrl* and Vrr* by the corresponding yaw control coefficients Kl and Kr, respectively, and obtains the corrected target rotational speed command values Vrkl* and Vrkr* for the left and right wheels 18 and 20. The torque command calculating section 84 calculates torque commands τrl and τrr corresponding to the respective electric motors 22 and 24 based on the deviation between the corrected target rotational speed command values Vrkl* and Vrkr*, and the rotational speed detection values Vrl and Vrr of the respective electric motors 22 and 24 detected by the two rotational speed sensors 62 provided at the electric motors 22 and 24 for the left and right wheels. For this purpose, the torque command calculating section 84 has torque command PID calculation sections 88 and 90 for the left and right wheels 18 and 20, which perform PID calculation.

The torque command PID calculation section 88 for the left wheel receives the deviation between the corrected target rotational speed command value Vrkl for the left wheel 18 and the rotational speed detection value Vrl of the electric motor 22 for the left wheel, calculates the torque command τrl for the electric motor 22 for the left wheel by performing PID calculation, and inputs the torque command τrl in the motor control section 64 (FIG. 2). The motor control section 64 has a corresponding drive circuit including an inverter, and the corresponding driver circuit controls drive of the electric motor 22 for the left wheel by the drive voltage corresponding to the torque command.

Likewise, the torque command PID calculation section 90 for the right wheel 20 receives the deviation between the corrected target rotational speed command value Vrkr* for the right wheel 20 and the rotational speed detection value Vrr of the electric motor 24 for the right wheel, calculates the torque command τrr of the electric motor 24 for the right wheel by performing PID calculation, and inputs the torque command τrr in the motor control section 64 (FIG. 2). The corresponding driver circuit included in the motor control section 64 controls driving of the electric motor 24 for the right wheel by the drive voltage corresponding to the torque command. In this manner, the control section 74 corrects the two respective target rotational speed command values by two correction coefficients, and controls the drive of the two electric motors 22 and 24 for wheels based on the two target rotational speed command values which are corrected. Further, the controller 48 controls the drive of the electric motors 22 and 24 for the left and right wheels based on the detection signals from various sensors, including the accelerator depression amount, the steering angle, and the yaw rate. Further, when the absolute value of the output of the PID calculation section 78 becomes a predetermined value or more, the controller 48 controls the drive of the respective electric motors 22 and 24 by setting the yaw control coefficient corresponding to one electric motor for wheel of the two electric motors 22 and 24 for wheels at a negative value, so as to generate drive torque in the reverse direction with respect to the normal rotation corresponding to the traveling direction in the one electric motor for wheel.

Each of the functions of such a controller 48 can be configured by a computer except for the driver circuit portion. The above-described respective functions can be realized by software, and can be realized by executing a lawnmower vehicle control program in concrete. As a matter of course, part of the above-described respective functions can be realized by hardware.

According to such a lawnmower vehicle 10, the two target rotational sped command values Vrl* and Vrr* of the respective two electric motors 22 and 24 for wheels are calculated based on the acceleration instruction and the turn instruction input by the driver, the target yaw rate γ* is calculated based on the acceleration instruction and the turn instruction, and the two correction coefficients Kl and Kr respectively relating to the two electric motors 22 and 24 for wheels are acquired based on the deviation between the target yaw rate γ* and the yaw rate detection value γ of the yaw rate sensor 60. Further, the two respective target rotational speed command values Vrl* and Vrr* are corrected by the two correction coefficients Kl and Kr, and based on the two corrected target rotational speed command values Vrkl* and Vrkr*, drive of the two electric motors 22 and 24 for wheels is controlled. Therefore, in the configuration in which the left and right wheels 18 and 20 can be independently driven to travel by the two respective electric motors 22 and 24 for wheels, even when the vehicle 10 travels on a sloping surface, the vehicle is enabled to travel in the direction desired by the driver, such as the straight traveling direction or the turn traveling direction, and furthermore, the behavioral characteristics of the vehicle 10 at the time of control operation based on the deviation between the detected value and the target value of the yaw rate can be easily set freely.

Figure 3:
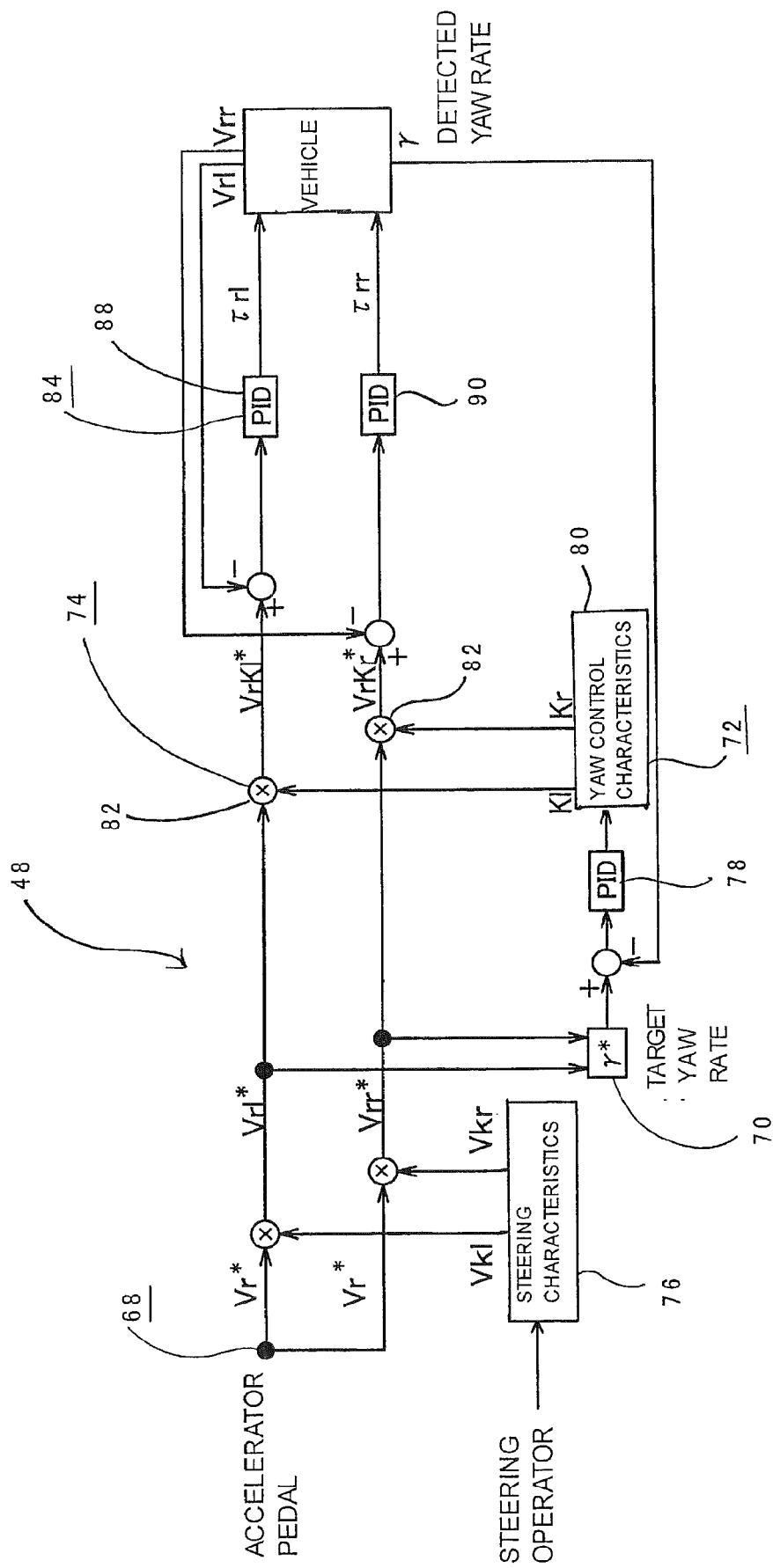
FIG. 3 is a block diagram showing a functional configuration of a controller configuring a control system of the lawnmower vehicle of the first embodiment.
Figure 8:
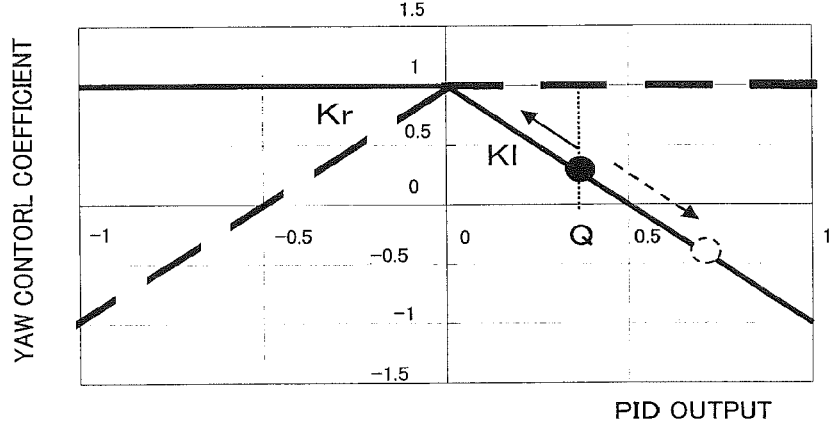
FIG. 8 is a diagram for explaining change of the yaw control coefficient when the PID output changes in FIG. 7.

For example, in FIG. 3, when the target yaw rate γ* is larger than the detected yaw rate γ when the vehicle turns to the left side; that is, when the turn radius of the vehicle tends to increase, the PID calculation section 78 outputs a certain positive value Q (see FIG. 8) as the PID output, and the main correction coefficient acquiring section 80 outputs 1 as the yaw control coefficient Kr for the right wheel, and outputs the value smaller than 1 as the yaw control coefficient Kl for the left wheel by using the map shown in FIG. 8. Therefore, the corrected target rotational speed command value VrKl* for the left wheel 18 becomes small, and as a result, the detected yaw rate γ easily becomes closer to the target yaw rate γ*. In this case, in the map of FIG. 8, the yaw control coefficient Kl for the left wheel changes in the direction shown by the solid arrow and easily becomes closer to 1. When the target yaw rate γ* and the detected yaw rate γ completely correspond to each other, the yaw control coefficient Kl for left wheel also becomes 1, and therefore, the corrected target rotational speed command values VrKl* and VrKr* for the left and right wheels 18 and 20 respectively become the same as the target rotational speed command values Vrl* and Vrr*.

Meanwhile, even when the target rotational speed command values Vrl* and Vrr* are corrected by the output of the main correction coefficient acquiring section 80 for the reason that the PID calculation section 78 performs calculation including integral calculation, and the like, if the effect of the correction is small, there is the possibility that the PID output becomes large. In this case, in the direction shown by the broken line arrow in FIG. 8, the yaw control coefficient Kl for left wheel changes in the direction shown by the broken line arrow, and further becomes smaller. For example, when the yaw control coefficient Kl for the left wheel becomes a negative value, the corrected target rotational speed command value VrKl* for the left wheel changes to a negative value from a positive value, and this corresponds to causing the electric motor 22 for the left wheel to generate the drive torque in the reverse direction. In the above description, the case in which the vehicle turns to the left side is described, and when the vehicle turns to the right side, the yaw control coefficient Kr for the right wheel changes. As configured as above, even when the vehicle performs traveling along contour lines and turn traveling on, for example, a sloping surface, the target rotational speed command value can be corrected to eliminate the deviation between the yaw rate detection value and the target yaw rate, side slip and turn in the undesired direction of the vehicle can be prevented, and the vehicle can be made to travel in the direction desired by the driver.

Figure 9:
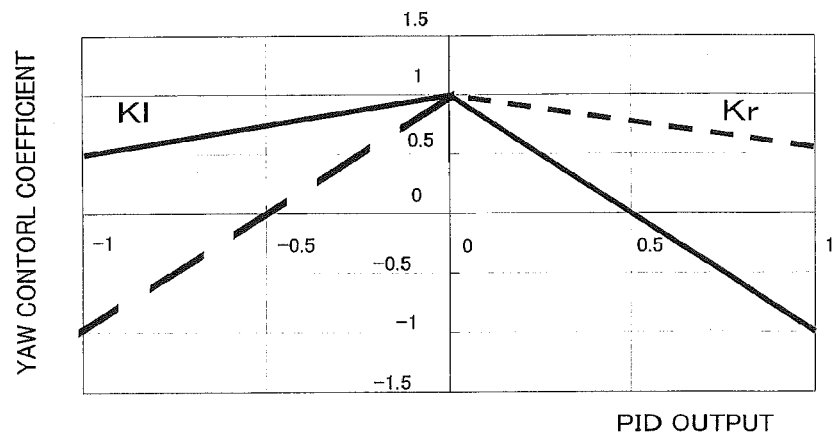
FIG. 9 is a diagram showing a first example of another example of the map shown in FIG. 7.
Figure 10:
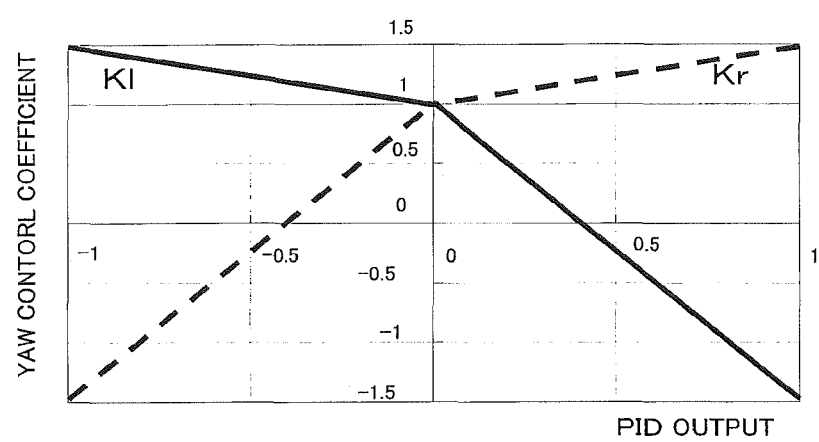
FIG. 10 is a diagram showing a second example of the other example of the map shown in FIG. 7.

Furthermore, the two respective target rotational speed command values Vrl* and Vrr* are corrected by the two correction coefficients Kl and Kr, and therefore, the setting of the two correction coefficients Kl and Kr can be easily changed, so that the behavioralial characteristics of the vehicle at the time of control operation based on the deviation between the detected value and the target value of the yaw rate can be easily set freely. For example, by changing the setting of the map which defines the two correction coefficients Kl and Kr in advance, the relationship between the PID output and the correction coefficients Kl and Kr can be easily changed. For example, the map shown in FIG. 7 is one example, and the slopes of the yaw control coefficients Kl and Kr to the PID output can be changed. As shown in FIG. 9, both of the two yaw control coefficients Kl and Kr can be made gradually smaller as the absolute value of the PID output becomes larger. Further, as shown in FIG. 10, only one of the two yaw control coefficients Kl and Kr can be made gradually larger as the absolute value of the PID output becomes larger. In this case, the other one of the two yaw control efficients Kl and Kr can be gradually decreased, or can be set at a fixed value.

Further, when the absolute value of the output of the PID calculation section 78 becomes a predetermined value or more, the controller 48 controls the drive of the respective electric motors 22 and 24 so that the electric motor generates the drive torque in the reverse direction with respect to normal rotation corresponding to the traveling direction in one electric motor 22 (or 24) for wheel out of the two electric motors 22 and 24 for wheels. More specifically, at the time of forward-travel of the vehicle, the controller 48 makes the one electric motor 22 (or 24) for wheel generate the drive torque in the reverse direction with respect to the normal direction corresponding to the forward-travel direction. Further, at the time of reverse-travel of the vehicle, the controller 48 makes the one electric motor 22 (or 24) for wheel generate the drive torque in the reverse direction with respect to the normal rotation corresponding to the reverse-travel direction. Therefore, even when the deviation between the target yaw rate γ* and the yaw rate detection value γ is large, the deviation is eliminated more quickly, and stable travel is easily realized.

In the present embodiment, the caster wheels 14 and 16 are used as the steering control wheels, but instead of the caster wheels 14 and 16, the mechanical steering type steering control wheel operatively connected to the steering operator 50 via the steering mechanism can be used. The steering mechanism includes, for example, a rack and pinion mechanism which converts rotational force of the steering shaft connected to the steering operator 50 into force in the linear direction, and is configured to be able to steer the left and right steering control wheels by pushing and pulling the rack shaft which is linked to the rotation of the steering shaft.

Further, in the present embodiment, the PID calculation section 78 is used as the calculation section included in the correction coefficient acquiring section 72, but instead of the PID calculation section 78, a PI calculation section which performs PI calculation can be used.

Second Embodiment of the Invention

Figure 11:
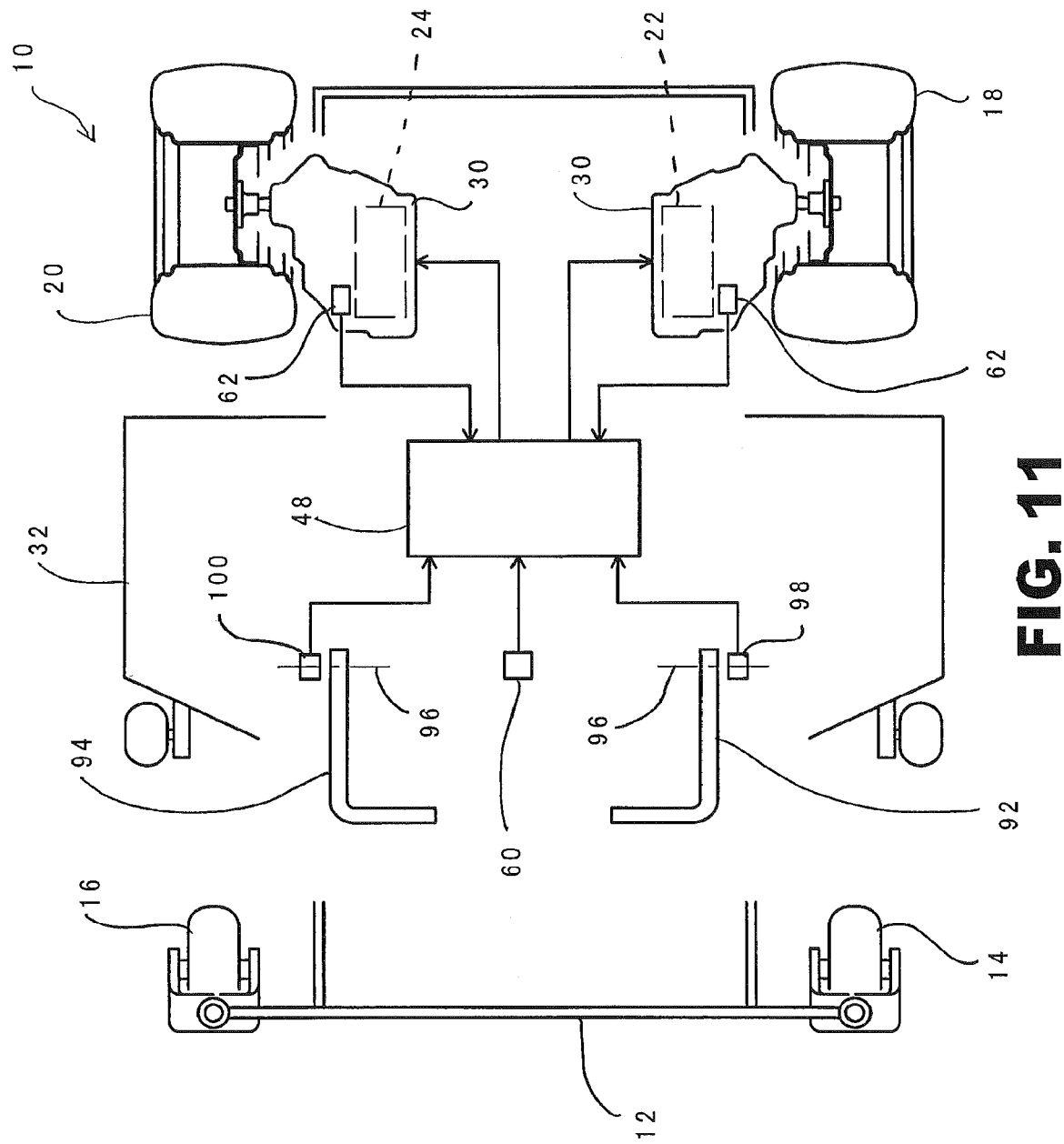
FIG. 11 is a schematic illustration of a configuration of a lawnmower vehicle seen from an upper side, which is a riding-type ground working vehicle of a second embodiment according to the present invention.
Figure 12:
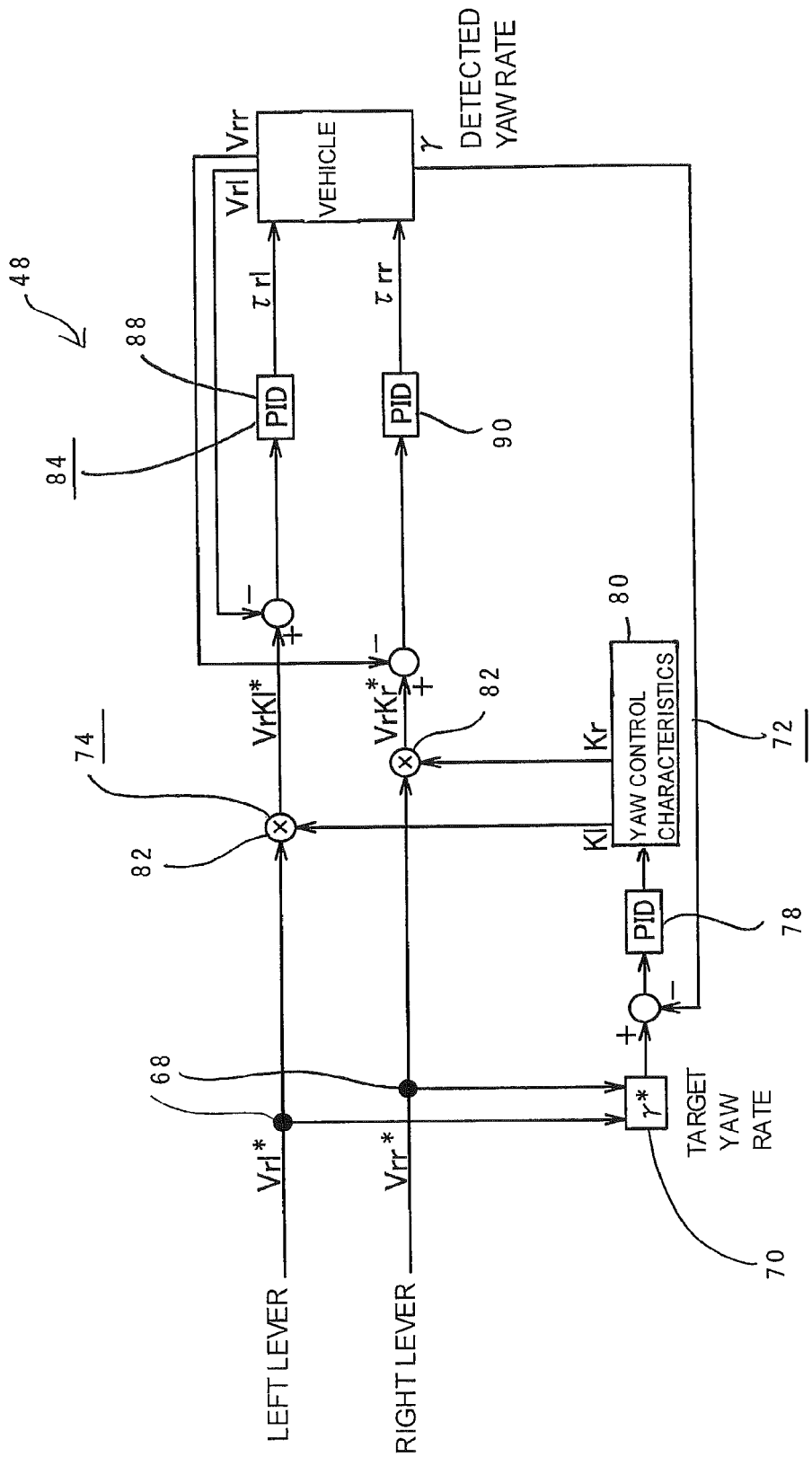
FIG. 12 is a block diagram showing a functional configuration of a controller in the lawnmower vehicle of the second embodiment.

FIG. 11 shows the lawnmower vehicle 10 which is a riding-type ground working vehicle of a second embodiment of the present invention. FIG. 12 is a block diagram showing the functional configuration of the controller 48 in the lawnmower vehicle 10 of the second embodiment. As shown in FIG. 11, in the case of the lawnmower vehicle 10 of the present embodiment, the steering operator 50 and the forward-travel side and the reverse-travel side accelerator pedals 52 and 54 are omitted in the above-described first embodiment, but as the acceleration operator and the turn operator, left and right levers 92 and 94, which are two-lever type operators, are provided. The left and right levers 92 and 94 are provided at the positions separated at both left and right sides of the seat 46 (see FIG. 17), and are respectively supported at portions fixed to the main frame 12 to be swingable to the front and the back with a swing center shaft 96 in the horizontal direction extending in the lateral direction employed as the center.

By swinging the left lever 92 forward or backward, drive of the electric motor 22 for the left wheel in the normal rotational direction or reverse direction is enabled. By making the swing amount large, the rotational speed of the electric motor 22 for the left wheel becomes high, and by making the swing amount small, the rotational speed becomes low. Similarly, by swinging the right lever 94 forward or rearward, drive of the electric motor 24 for the right wheel in the normal rotational direction or the reverse direction is enabled. By making the swing amount large, the rotational speed of the electric motor 24 for the right wheel becomes high, and by making the swing amount small, the rotational speed becomes low. More specifically, the left and right levers 92 and 94 can receive the rotational speeds of the electric motors 22 and 24 for the left and right wheels as an acceleration instruction and a turn instruction. More specifically, the two lever type operators can receive an acceleration instruction and a turn instruction in concert with each other.

The operation values which are the swing amounts and the swing directions of the left and right levers 92 and 94 are respectively detected by the left lever sensor 98 and the right lever sensor 100, and the detection signals are transmitted to the controller 48 as shown in FIG. 2 by reference. As shown in FIG. 12, the controller 48 includes the command value calculating section 68, the target yaw rate calculating section 70, the correction coefficient acquiring section 72, and the control section 74 as in the first embodiment. In the following description, the same components as those in FIG. 11 are assigned the same reference numerals. The command value calculating section 68 acquires an acceleration instruction and a turn instruction; that is, an operation value input by a driver by using the left and right lever sensors 98 and 100, and calculates the respective two target rotational speed command values Vrl* and Vrr* of the two electric motors 22 and 24 for wheels based on the operation value. In this case, the command value calculating section 68 calculates the target rotational speed command value Vrl* for the left wheel 18 and the target rotational speed command value Vrr* for the right wheel 20 respectively corresponding to the detection values of the respective lever sensors 98 and 100. The target rotational speed command values Vrl* and Vrr* are positive values when the electric motors 22 and 24 are made to generate drive torque in the normal rotation direction corresponding to the forward-travel side, and are negative values when the electric motors 22 and 24 are made to generate drive torque in the reverse direction corresponding to the reverse-travel side.

Meanwhile, the target yaw rate calculating section 70 calculates a target yaw rate γ* from the calculated target rotational speed command values Vrl* and Vrr*. Further, the correction coefficient acquiring section 72 acquires two correction coefficients Kl and Kr respectively relating to the two electric motors 22 and 24 for wheels based on the deviation between the target yaw rate γ*, and the yaw rate detection value γ detected by the yaw rate sensor 60. The functions of such target yaw rate calculating section 70 and correction coefficient acquiring section 72 are the same as in the case of the above described first embodiment. The control section 74 corrects the target rotational speed command values Vrl* and Vrr* by the respective yaw control coefficients Kl and Kr for the left and right wheels 18 and 20 output by the correction coefficient acquiring section 72. The other configuration and operation are the same as those in the above-described first embodiment.

Third Embodiment of the Invention

Figure 13:
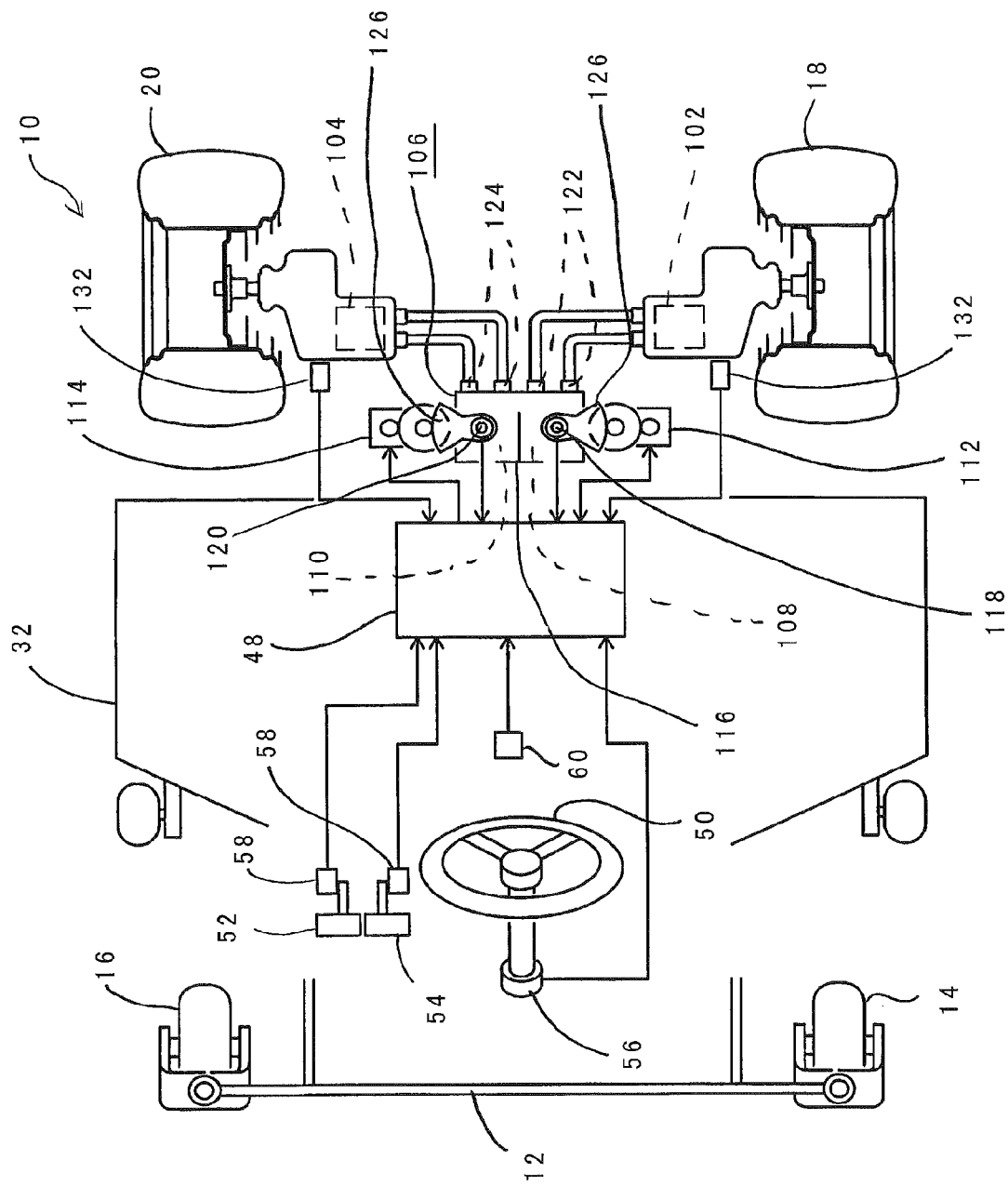
FIG. 13 is a schematic illustration of a configuration of a lawnmower vehicle seen from an upper side, which is a riding-type ground working vehicle of a third embodiment according to the present invention.
Figure 14:
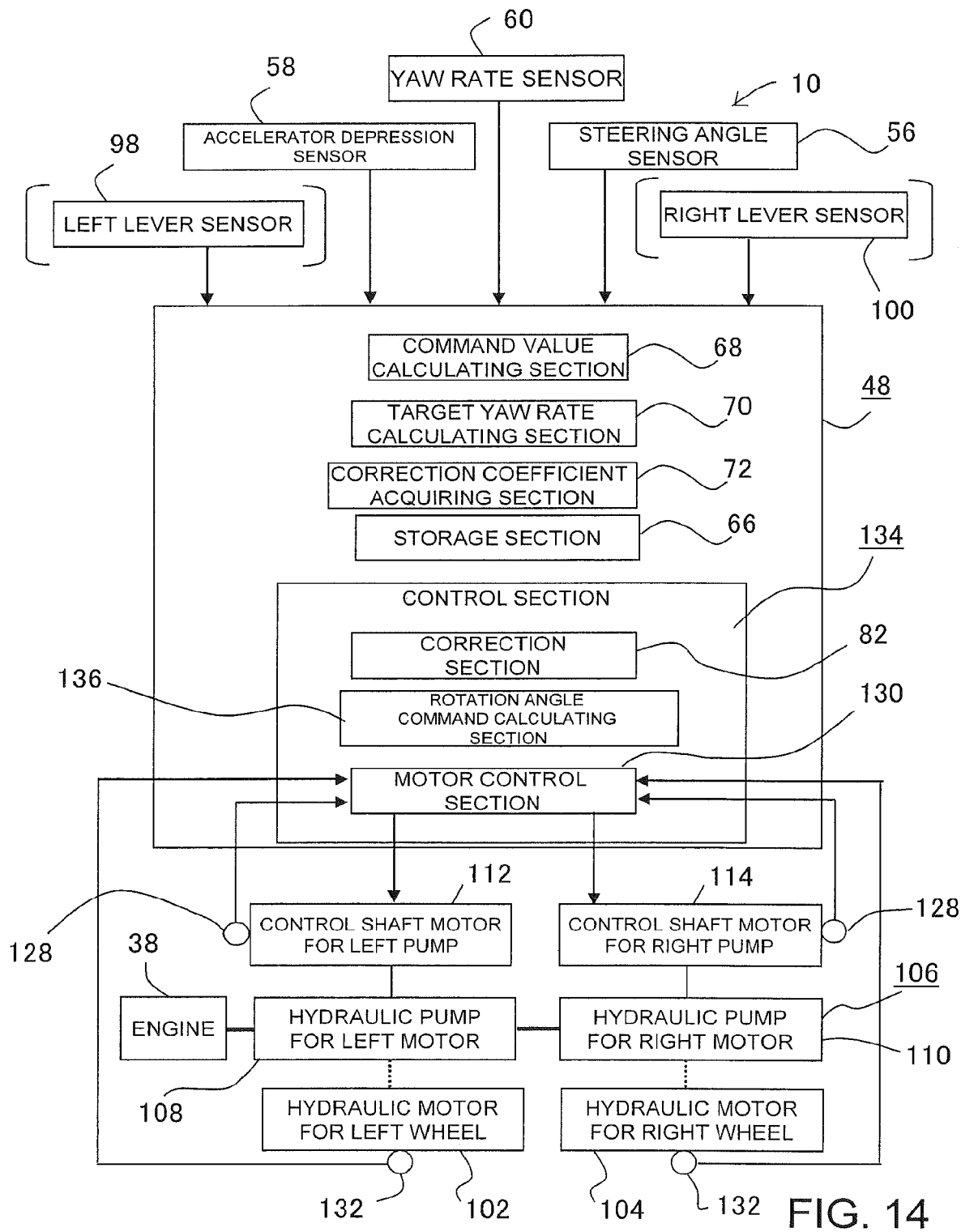
FIG. 14 is a diagram showing configurations of lawnmower vehicles of third and fourth embodiments.
Figure 15:
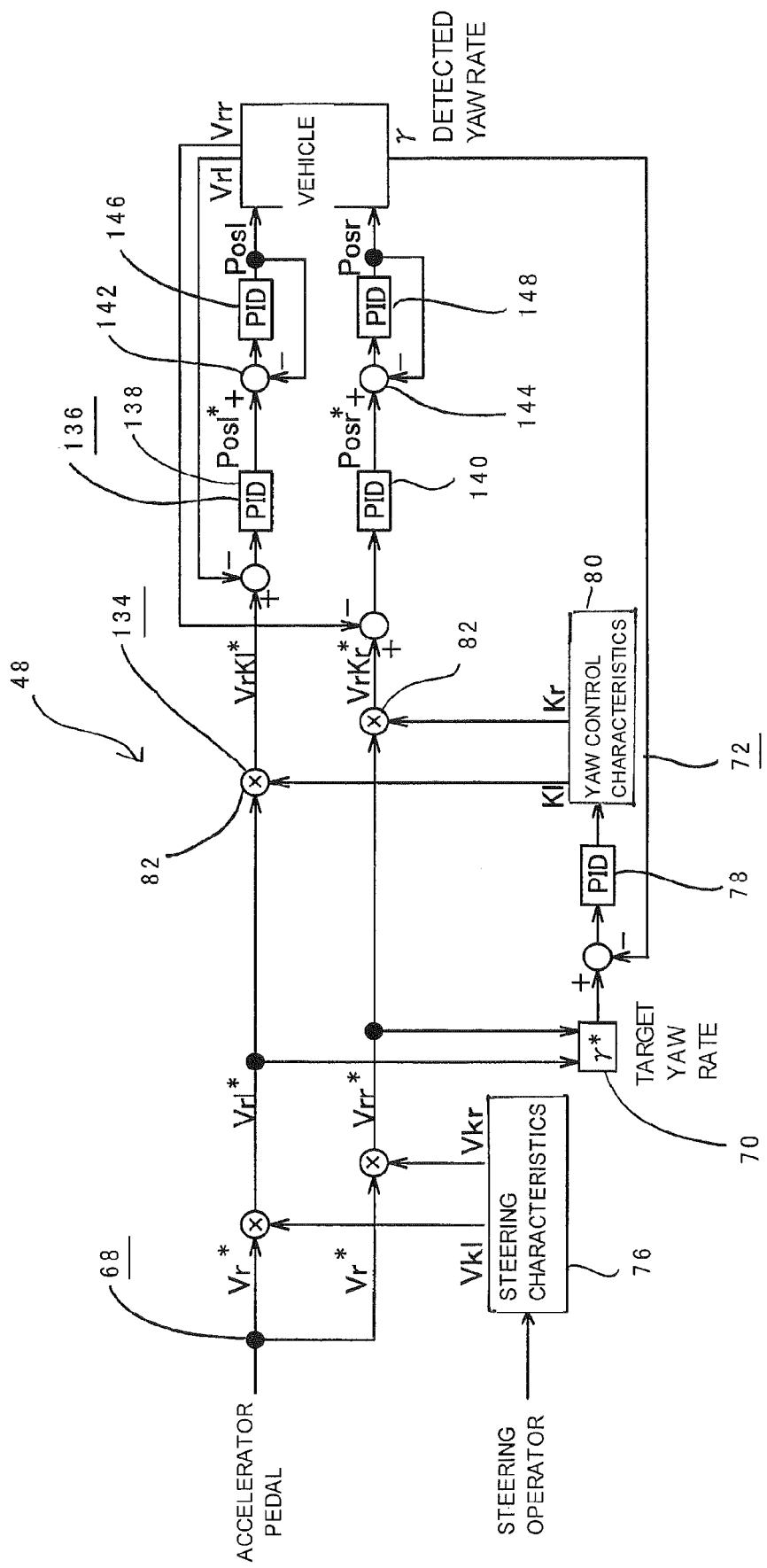
FIG. 15 is a block diagram showing a functional configuration of a controller of the lawnmower vehicle of the third embodiment.

FIG. 13 shows the lawnmower vehicle 10 which is a riding-type ground working vehicle of a third embodiment of the present invention. FIG. 14 is a diagram showing a configuration of the lawnmower vehicle 10 of the third embodiment. FIG. 15 is a block diagram showing a functional configuration of the controller 48 of FIG. 14. FIG. 14 also shows the lever sensors 98 and 100 which are the components of a fourth embodiment described later, in parentheses. In the present embodiment, hydraulic motors 102 and 104 for the left and right wheels that are traction motors are provided instead of the electric motors 22 and 24 for the left and right wheels in the first embodiment shown in the above described FIGS. 1 to 10. Further, the lawnmower vehicle 10 is provided with an engine 38 (FIG. 14), which is an actuator power source, and a hydraulic pump unit 106, which is an actuator driven by the engine 38. The hydraulic pump unit 106 includes two hydraulic pump main bodies 108 and 110, and two control shaft electric motors 112 and 114 corresponding to the respective hydraulic pump main bodies 108 and 110, and unillustrated pump shafts of the two hydraulic pump main bodies 108 and 110 are operatively connected by a power transmission mechanism such as a gear mechanism. The engine 38 may be of a horizontal type with the output shaft oriented in the horizontal direction, or may be of a vertical type with the output shaft oriented in the vertical direction.

Further, one pump shaft out of the two hydraulic pump main bodies 108 and 110 is driven by the engine 38. Therefore, one of the pump shafts is driven by drive of the engine 38, and the other pump shaft is also driven via the power transmission mechanism. The respective hydraulic pump main bodies 108 and 110 are movable swash plate type variable displacement pumps, and the inclinations of the unillustrated movable swash plates are made adjustable by change of the rotation angles of two control shafts 118 and 120 which are rotatably supported at the pump case 116 and correspond to the respective pump main bodies. The rotation angles of the two control shafts 118 and 120 which are parallel with each other and rotatably disposed are changed by the corresponding control shaft electric motors 112 and 114. For example, in the example of FIG. 13, the control shafts 118 and 120 are disposed to be oriented in the vertical direction (the front and back direction of FIG. 13) of the lawnmower vehicle 10. The respective control shaft electric motors 112 and 114 are operatively connected to the corresponding control shaft 118 and 120, and change the rotation angles of the corresponding control shafts 118 and 120. Further, by change of the inclination of the movable swash plate, the amounts and the flow directions of sucked or discharged pressure oil of the corresponding hydraulic pump main bodies 108 and 110 can be changed. Each of the hydraulic pump main bodies 108 and 110 is of an axial piston type, for example. However, as each of the hydraulic pump main bodies 108 and 110, other types such as a radial piston type also can be adopted.

Discharge ports 122 and 124 of the two hydraulic pump main bodies 108 and 110 are connected to the hydraulic motors 102 and 104 for the left and right wheels through conduit lines to be capable of discharging and sucking the pressure oil to and from the discharge ports 122 and 124. The pressure oil which is discharged from the hydraulic pump main bodies 108 and 110 is supplied to the hydraulic motors 102 and 104, and thereby, the hydraulic motors 102 and 104 are driven. As the discharge amounts of the pressure oil from the hydraulic pump main bodies 108 and 110 become larger, the rotational speeds of the hydraulic motors 102 and 104 become higher, and as the discharge amounts of the pressure oil from the hydraulic pump main bodies 108 and 110 become smaller, the rotational speeds of the hydraulic motors 102 and 104 become lower.

Further, the respective hydraulic pump main bodies 108 and 110 have the two discharge ports 122 and 124, wherein one of the two discharge ports 122 and 124 is made to function for discharge of the pressure oil, and the other one is made to function for suction of the pressure oil. In response to switch of the directions to rotate the hydraulic motors 102 and 104, the discharge ports 122 and 124, which are made to function for discharge of the pressure oil, and the discharge ports 122 and 124, which are made to function for suction of the pressure oil, are switched. Like this, the respective hydraulic pump main bodies 108 and 110 can discharge the pressure oil independently from the two discharge ports 122 and 124, and the hydraulic pump unit 106 is configured so that the discharge amounts of the pressure oil discharged from the two discharge ports 122 and 124 corresponding to the respective two control shafts 118 and 120 are changed by change of the rotation angles of the two control shafts 118 and 120. Further, when the flow directions of the pressure oil from the hydraulic pump main bodies 108 and 110 corresponding to the respective hydraulic motors 102 and 104 are switched, the normal rotation and reverse rotation of the respective hydraulic motors 102 and 104 are switched.

The respective control shaft electric motors 112 and 114 rotate in the normal rotation direction or the reverse rotation direction by being supplied with the electric power from the battery 42 (see FIG. 2) through the driver circuit configuring the controller 48. Output shafts of the control shaft electric motors 112 and 114 are operatively connected to the control shafts 118 and 120 via a clutch mechanism and an unillustrated worm transmission mechanism, and sector transmission mechanisms 126. The worm transmission mechanism has worm shafts provided to be able to transmit power to the output shafts of the control shaft electric motors 112 and 114 via a clutch mechanism, and worm wheels which are meshed with the worm shafts. The sector transmission mechanism 126 is configured by an output gear coupled with the worm wheel to be incapable of relative rotation, and a sector gear including a substantially sector portion meshed with the output gear. The control shafts 118 and 120 are coupled to the sector gears to be unable to rotate relatively. Unillustrated engaging arms are provided at end portions at opposite sides with respect to the control shafts 118 and 120; of the sector gear, stopper portions fixed to a pump case are opposed to each other with a space therebetween, at both sides of each of the engaging arms, and thereby, the rotation range of the sector gear is restricted to a predetermined range.

The clutch mechanism includes a reverse rotation preventing mechanism which prevents the worm shaft from rotating by the force from the pump shaft side while allowing the worm shaft to rotate in response to the rotation of the control shaft electric motors 112 and 114. Such a clutch mechanism prevents the movable swash plates from unintentionally inclinedly rotating from the set inclinedly rotation position while allowing the inclinedly rotating operation of the movable swash plates by the control shaft electric motors 112 and 114.

Further, the hydraulic pump unit 106 is provided with two rotation angle sensors 128 (FIG. 14) which detect the rotation positions; that is, the rotation angle positions of the respective control shafts 118 and 120. The respective rotation angle sensors 128 are configured by opposing detecting portions fixed to the pump case 116 to detected portions provided at portions which rotate with the control shafts 118 and 120. For example, in FIG. 13, although illustration of the rotation angle sensors 128 is omitted, the two rotation angle sensors 128 can be disposed coaxially with the control shafts 118 and 120 to cover the upper sides of the control shafts 118 and 120. The detection signal from each of the rotation angle sensors 128 is input into the motor control section 130 configuring the controller 48.

Further, each of the hydraulic motors 102 and 104 is provided with a rotational speed sensor 132 that serves as rotational speed detecting section which detects the rotational speed of each of the hydraulic motors 102 and 104. The detection signal from each of the rotational speed sensors 132 is input in the controller 48. Each of the hydraulic motors 102 and 104 can be provided with a rotation angle sensor instead of the rotational speed sensor 132, the detection signal from the rotation angle sensor is input in the rotational speed calculating section configuring the controller 48, and the rotational speed of each of the hydraulic motors 102 and 104 can be calculated from the rotation angle detection value. In this case, the rotational speed detecting section are configured by the rotation angle sensor and the rotational speed calculating section.

Further, the controller 48 independently controls the rotational speeds of the hydraulic motors 102 and 104 for the left and right wheels by using the detection signals of various sensors as above and the detection signals from the accelerator depression sensor 58 and the steering angle sensor 56. For this purpose, the controller 48 calculates the rotation angle command values for the two control shaft electric motors 112 and 114 corresponding to the hydraulic motors 102 and 104 for left and right wheels which drive the left and right wheels 18 and 20, and performs feedback control of the drive of the respective control shaft electric motors 112 and 114 so as to obtain actual rotation angles correspondingly to the respective rotation angle command values. Next, by reference to FIGS. 14 and 15, the configuration and function of the controller 48 are described with an emphasis on the part differing from the case of the first embodiment shown in FIGS. 1 to 10.

As shown in FIG. 14, the controller 48 includes the command value calculating section 68, the target yaw rate calculating section 70, the correction coefficient acquiring section 72, and control section 134. The functions of the command value calculating section 68, the target yaw rate calculating section 70, and the correction coefficient acquiring section 72 are similar to those in the first embodiment. The control section 134 includes the correction section 82, rotation angle command calculating section 136, and motor control section 130. The correction section 82 corrects the respective target rotational speed command values Vrl* and Vrr* of the hydraulic motors 102 and 104 for left and right wheels, which are two target rotational speed command values, by the two corresponding yaw control coefficients Kl and Kr, and obtains the corrected target rotational speed command values VrKl* and VrKr*. The rotation angle command calculating section 136 calculates rotation angle command values before correction Posl* and Posr* of the control shaft electric motors 112 and 114 based on the deviation between the corrected target rotational speed command values VrKl* and VrKr*, and the rotational speed detection values Vrl and Vrr of the respective hydraulic motors 102 and 104 detected by the two rotational speed sensors 132 provided at the hydraulic motors 102 and 104 for the left and right wheels. The rotation angle command values before correction Posl* and Posr* correspond to the discharge amounts and the discharge directions of the hydraulic pump main bodies 108 and 110 corresponding to the respective hydraulic motors 102 and 104. Further, the rotation angle command calculating section 136 calculates the rotation angle commands Posl and Posr by making correction by using the rotation angle detection values of the control shaft electric motors 112 and 114. For this purpose, the rotation angle command calculating section 136 has first PID calculation sections 138 and 140 for the left and right wheels 18 and 20, subtraction sections 142 and 144, and second PID calculation sections 146 and 148, which perform PID calculation based on the above-described deviation.

As shown in FIG. 15, the first PID calculation section 138 for the left wheel 18 receives the deviation between the corrected target rotational speed command value VrKl* and the rotational speed detection value Vrl of the hydraulic motor 120 for the left wheel, and calculates the rotation angle command value before correction Posl* of the control shaft electric motor 112 for the left wheel 18 by performing PID calculation. The subtraction section 142 outputs the deviation between the rotation angle command value before correction Posl* and the rotation angle detection value Posl to the second PID calculation section 146 for the left wheel 18. The rotation angle command value Posl of the control shaft electric motor 112 for the left wheel 18 is calculated by performing PID calculation, and is input into the motor control section 130. The motor control section 130 has a corresponding driver circuit including an inverter, and the corresponding driver circuit controls the drive of the control shaft electric motor 112 for the left wheel 18 in response to the rotation angle command. Thereby, drive of the hydraulic motor 102 for the left wheel is controlled.

Similarly, the first PID calculation section 140 for the right wheel 20 receives the deviation between the corrected target rotational speed command value VrKr* and the rotational speed detection value Vrr of the hydraulic motor 104 for the right wheel, and calculates the rotation angle command value before correction Posr* of the control shaft electric motor 114 for the right wheel 20 by performing PID calculation. The subtraction section 144 outputs the deviation between the rotation angle command value before correction Posr* and the rotation angle detection value Posr of the control shaft electric motor 114 to the second PID calculation section 148 for the right wheel 20. The rotation angle command value Posr of the control shaft electric motor 114 for the right wheel 20 is calculated by performing PID calculation, and is input into the motor control section 130. The corresponding driver circuit of the motor control section 130 controls drive of the control shaft electric motor 114 for the right wheel 20 in response to the rotation angle command. Thereby, drive of the hydraulic motor 104 for the right wheel is controlled.

As above, the control section 134 calculates the rotation angle command values Posl* and Posr* of the two control shafts 118 and 120 based on the deviation between the two target rotational speed command values VrKl* and VrKr* after being corrected by the correction coefficients, and the rotational speed detection values Vrl and Vrr of the two hydraulic motors 102 and 104 for wheels, and control drive of the two control shaft electric motors 112 and 114 by the respective rotation angle command values Posl* and Posr*. Therefore, the discharge amounts discharged from the two discharge ports 122 and 124 (FIG. 13) corresponding to the respective hydraulic motors 102 and 104 of the hydraulic pump unit 106 are changed. Thereby, drive of the two hydraulic motors 102 and 104 for the left and right wheels is controlled. The other configuration and operation are the same as those in the first embodiment shown in the above-described FIGS. 1 to 10, and redundant description is omitted by assigning the identical portions with the same reference numerals.

In the present embodiment, the pressure oil is configured to be supplied to the hydraulic motors 102 and 104 for the left and right wheels 18 and 20 from the two hydraulic pump main bodies 108 and 110 included by one hydraulic pump unit 106. However, as the hydraulic pump unit 106, with respect to the hydraulic pumps and the electric motors for control shafts, the structure of two hydraulic pump units can be adopted, which are two actuators for the left and right wheels 18 and 20, and separated from each other to correspond to the left and right wheels 18 and 20. In this case, the power of the engine can be transmitted to the respective two hydraulic pump units by the power transmission mechanism. Further, the two respective hydraulic pump units can be of the integral structure with the housing accommodating the two hydraulic motors 102 and 104 for the left and right wheels 18 and 20 and the reduction mechanism. In this case, the two discharge ports and the two hydraulic motors 102 and 104 of the two hydraulic pump units are connected via conduit lines to be able to discharge and suck the pressure oil with respect to the discharge port.

Fourth Embodiment of the Invention

Figure 16:
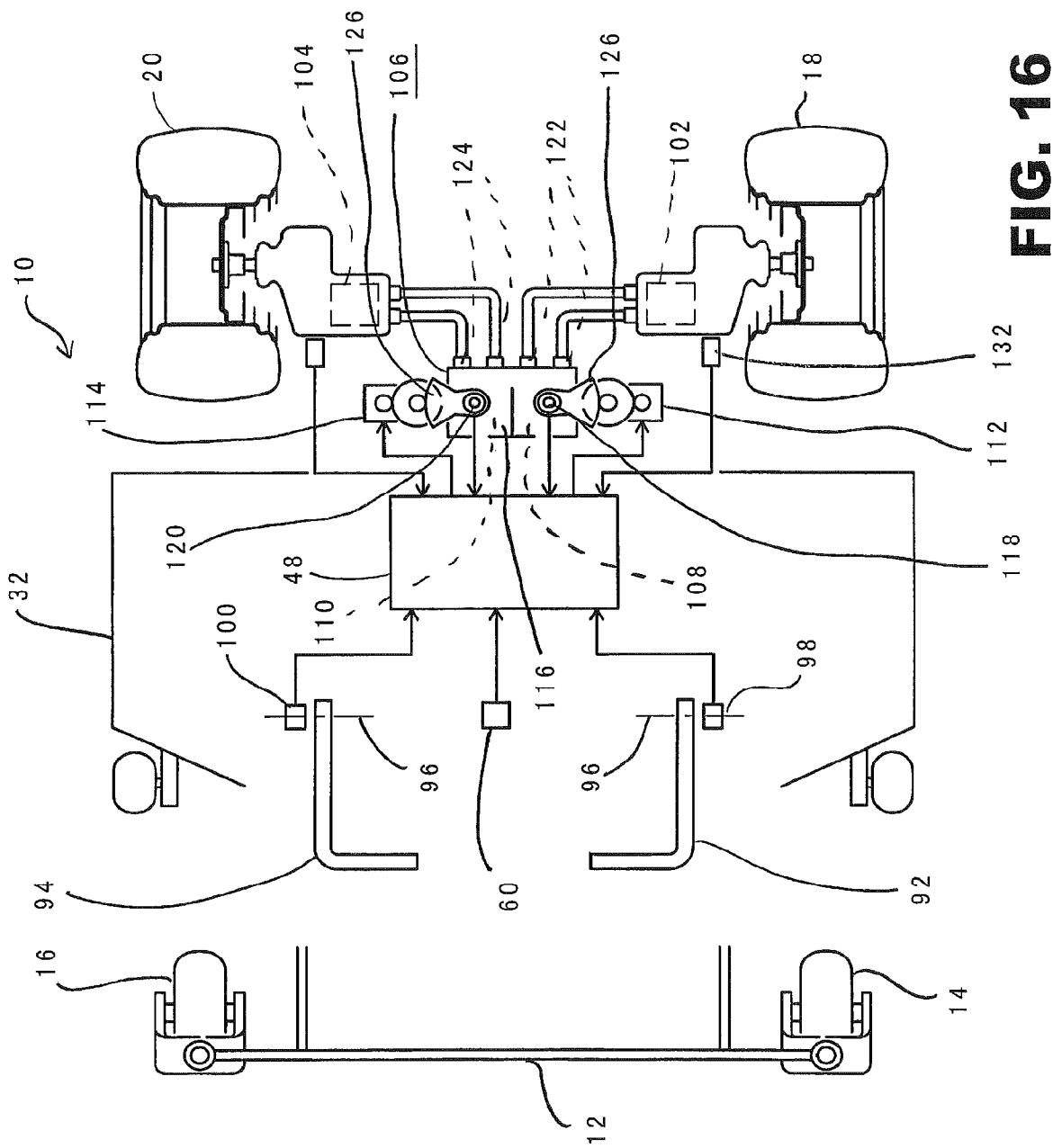
FIG. 16 is a schematic illustration of a configuration of a lawnmower vehicle seen from an upper side, which is a riding-type ground working vehicle of the fourth embodiment according to the present invention.
Figure 18:
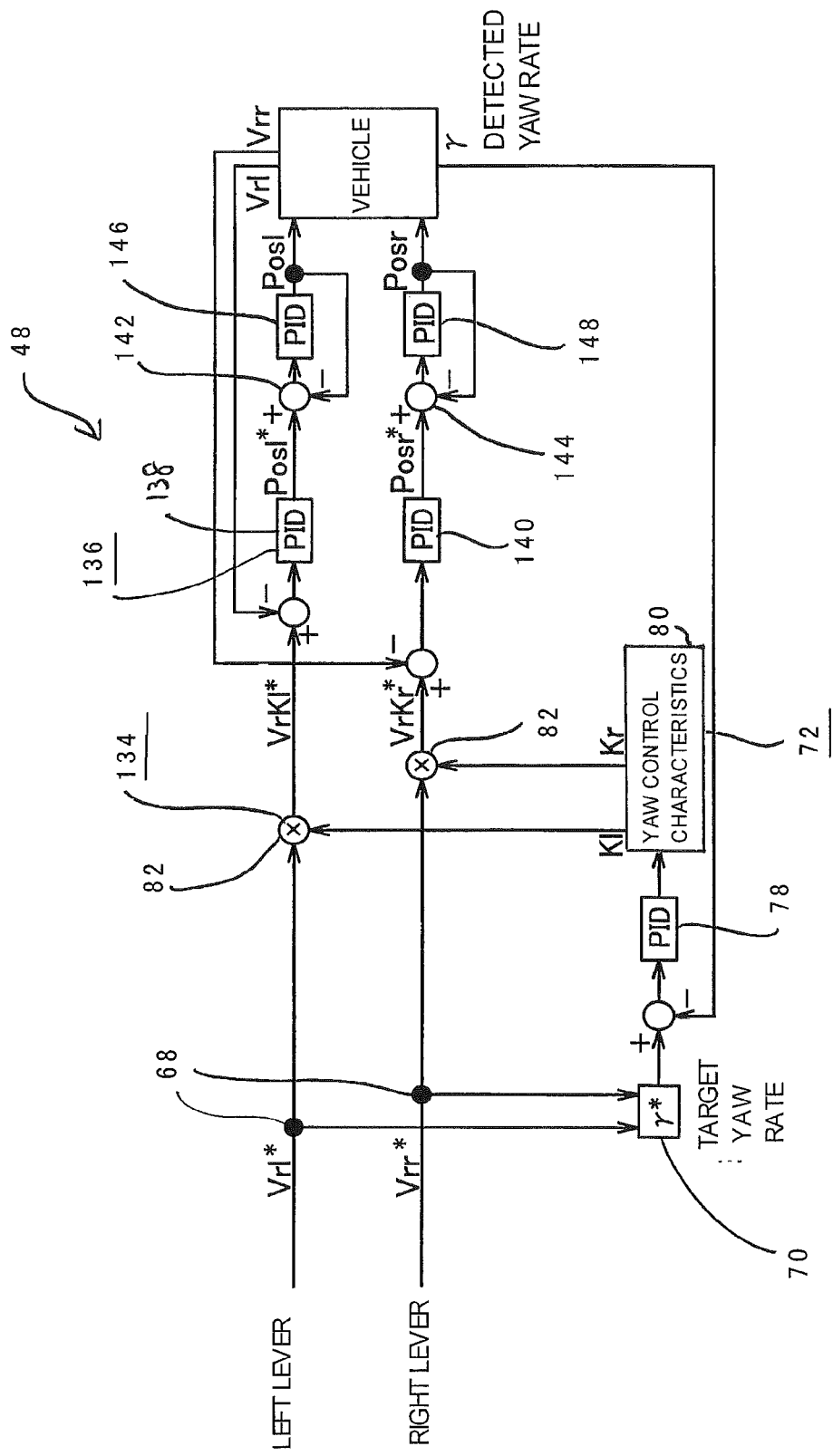
FIG. 18 is a block diagram showing a functional configuration of a controller in the lawnmower vehicle of the fourth embodiment.

FIG. 16 shows the lawnmower vehicle 10, which is a riding-type ground working vehicle of a fourth embodiment of the present invention. FIG. 17 is a schematic view of the vehicle 10 of FIG. 16 seen in the horizontal direction. FIG. 18 is a block diagram showing the functional configuration of the controller 48 in the lawnmower vehicle 10 of the fourth embodiment. In the present embodiment, the configuration of the third embodiment shown in FIGS. 13 to 15 is incorporated in the second embodiment shown in the above-described FIGS. 11 and 12. More specifically, in the third embodiment, the steering operator 50 and the forward-travel side and reverse-travel side accelerator pedals 52 and 54 are omitted from the lawnmower vehicle 10, and instead, the lawnmower vehicle 10 is provided with the left and right levers 92 and 94 which are two-lever type operators as in the case of the second embodiment as the acceleration operator and the turn operator. The left and right levers 92 and 94 are provided at the positions separated at both the left and right sides of the seat 46. More specifically, the two-lever type operators are made capable of receiving an acceleration instruction and a turn instruction in concert with each other.

The operation values, which are the swing amounts and swing directions of the left and right levers 92 and 94, are detected by the left and right lever sensors 98 and 100, and the detection signals are transmitted to the controller 48. The controller 48 includes the command value calculating section 68, the target yaw rate calculating section 70, the correction coefficient acquiring section 72, and the control section 134, as in the third embodiment shown in FIG. 14. The command value calculating section 68 calculates the two target rotational speed command values Vrl* and Vrr* of the two respective hydraulic motors 102 and 104 for wheels based on the acceleration instruction and turn instruction; that is, the operation values inputted by a driver by using the left and right lever sensors 98 and 100. The other configuration and operation are similar to the third embodiment shown in the above described FIGS. 13 to 15, or the second embodiment shown in FIGS. 11 and 12. In the case of the configuration shown in FIG. 16, for example, the control shafts 118 and 120 are disposed to be oriented in the vertical direction (front and back direction of FIG. 13) of the lawnmower vehicle 10, and the two rotation angle sensors 128 which detect the rotation angle positions of the control shafts 118 and 120 can be disposed on the same axes as the control shafts 118 and 120 to cover the upper sides of the control shafts 118 and 120 as the third embodiment shown in FIG. 13.

Fifth Embodiment of the Invention

Figure 19:
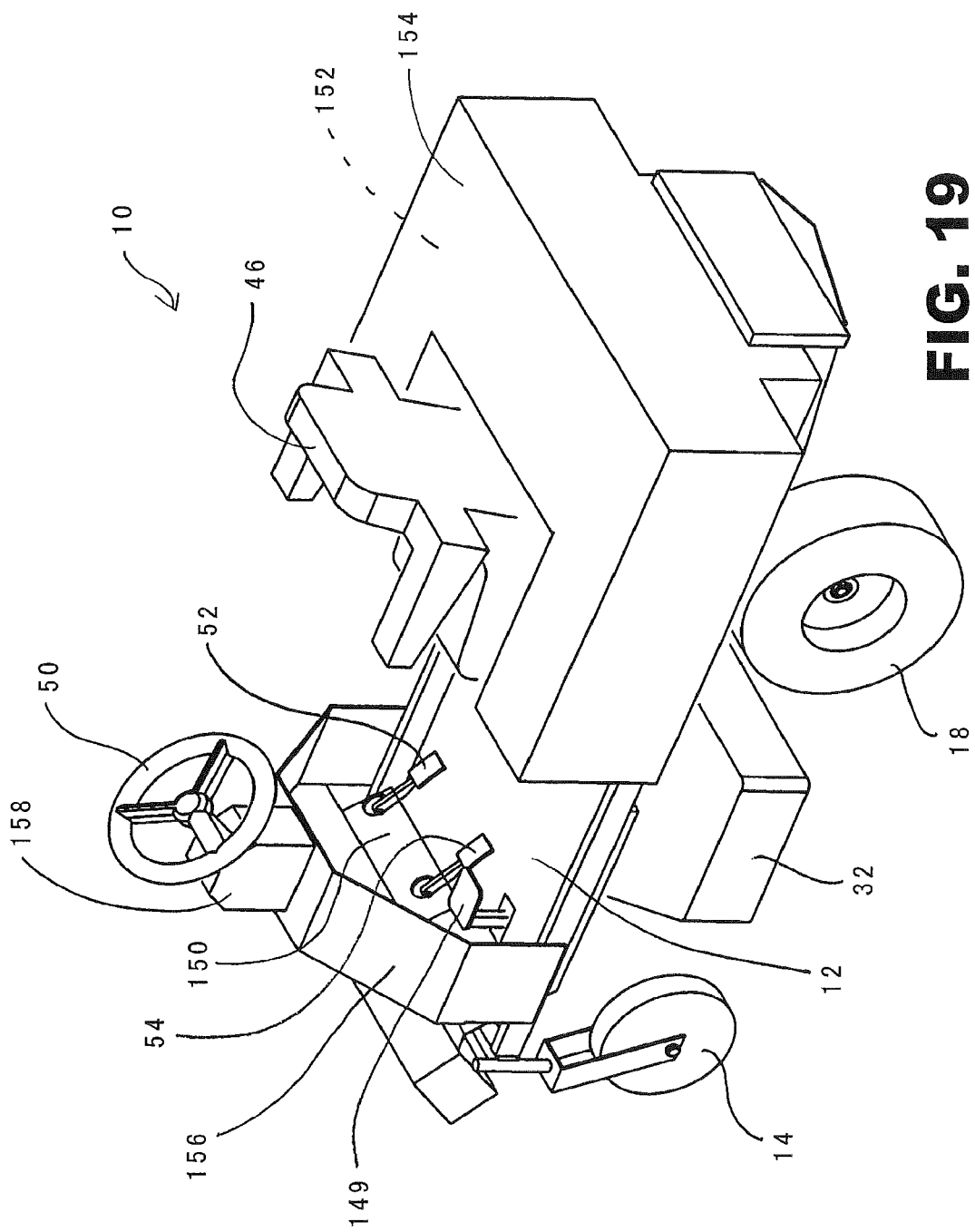
FIG. 19 is a perspective view showing a lawnmower vehicle, which is a riding-type ground working vehicle of a fifth embodiment according to the present invention.
Figure 20:
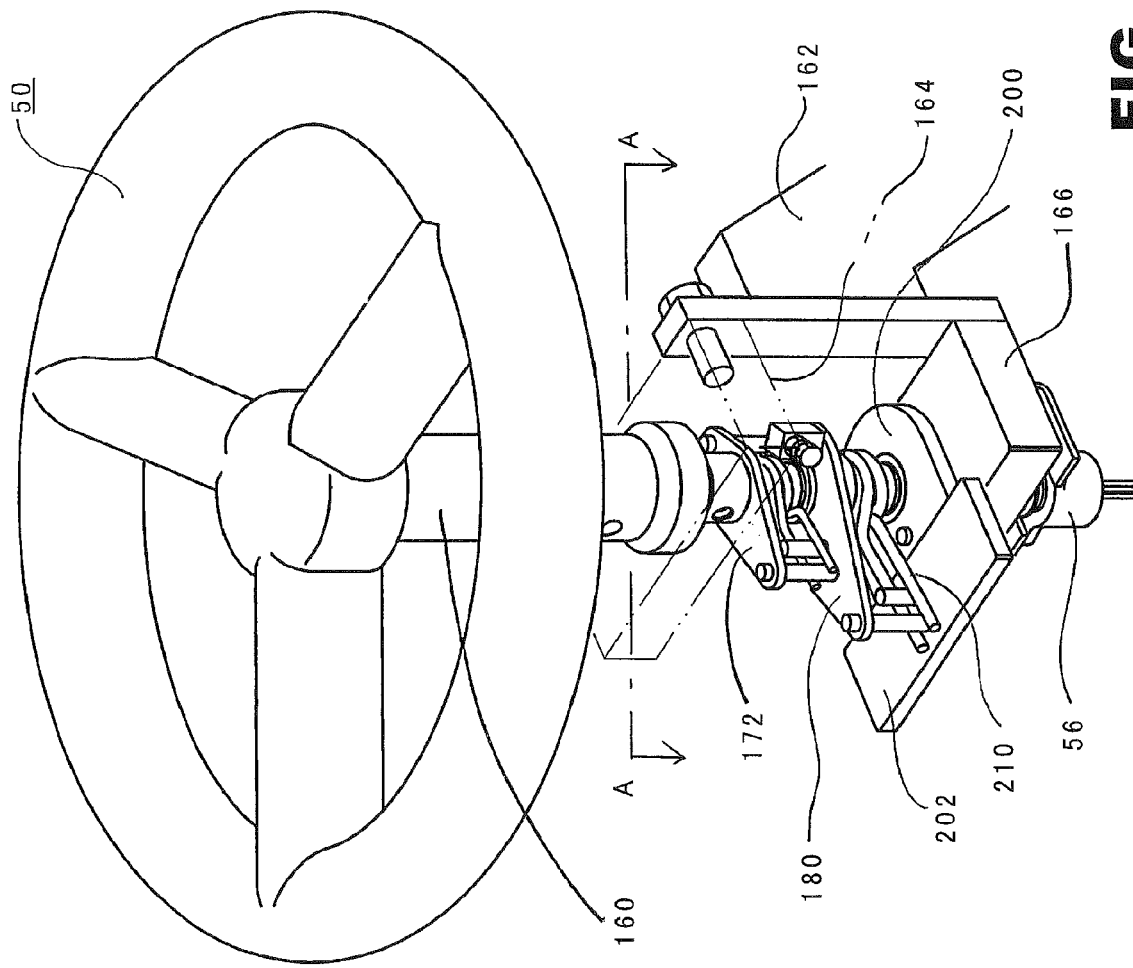
FIG. 20 is a perspective view showing a rotation support structure of a steering operator provided in the lawnmower vehicle of the fifth embodiment.
Figure 21:
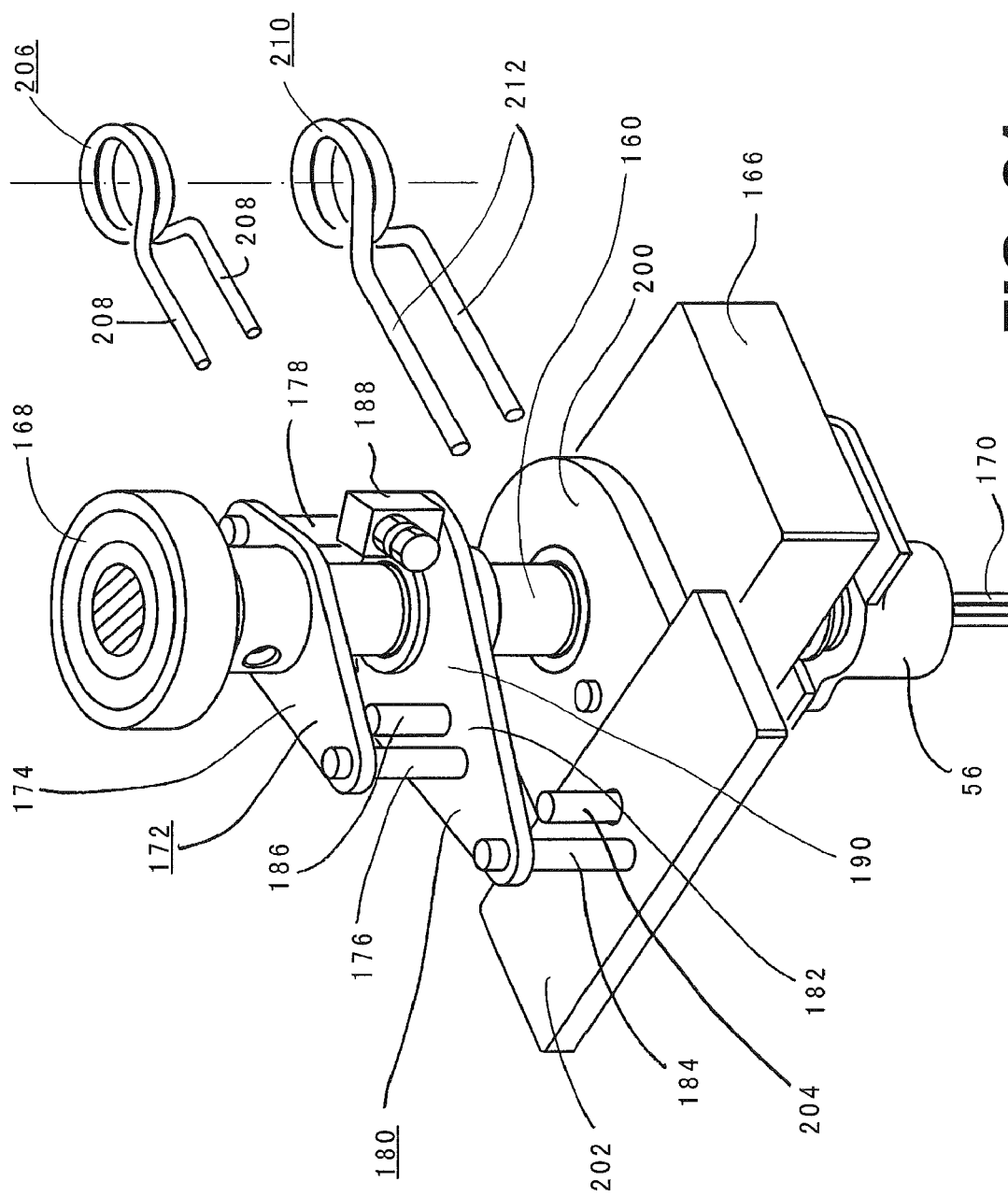
FIG. 21 is an enlarged view showing a state in which a portion A-A of FIG. 20 is cut, and an upper spring and a lower spring are removed.
Figure 22:
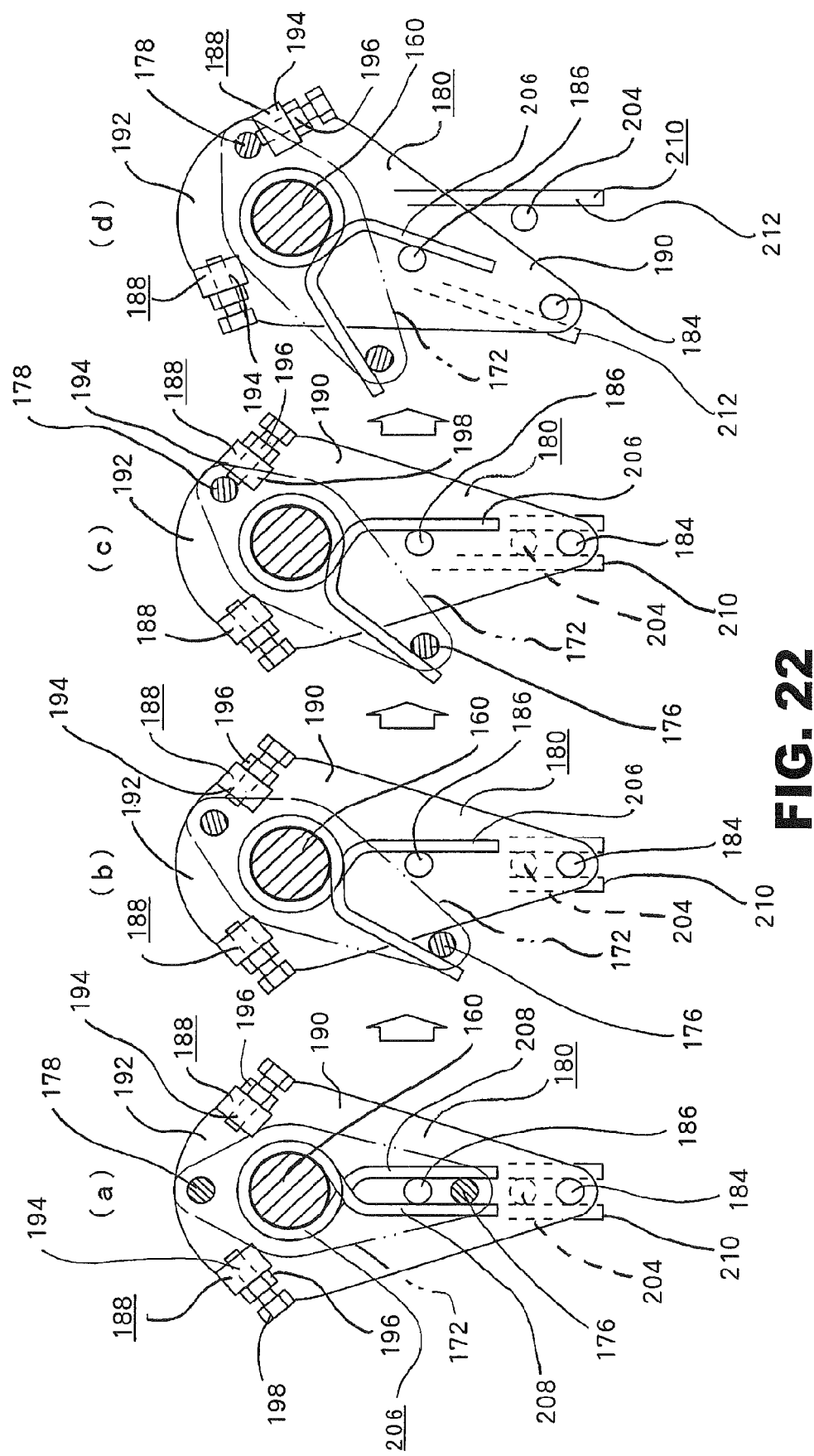
FIG. 22 is a view of FIG. 21 which is partially cut and seen from a top side to a bottom side, and shows a state of rotating the steering operator from a neutral position to one side in time sequence.
Figure 23:
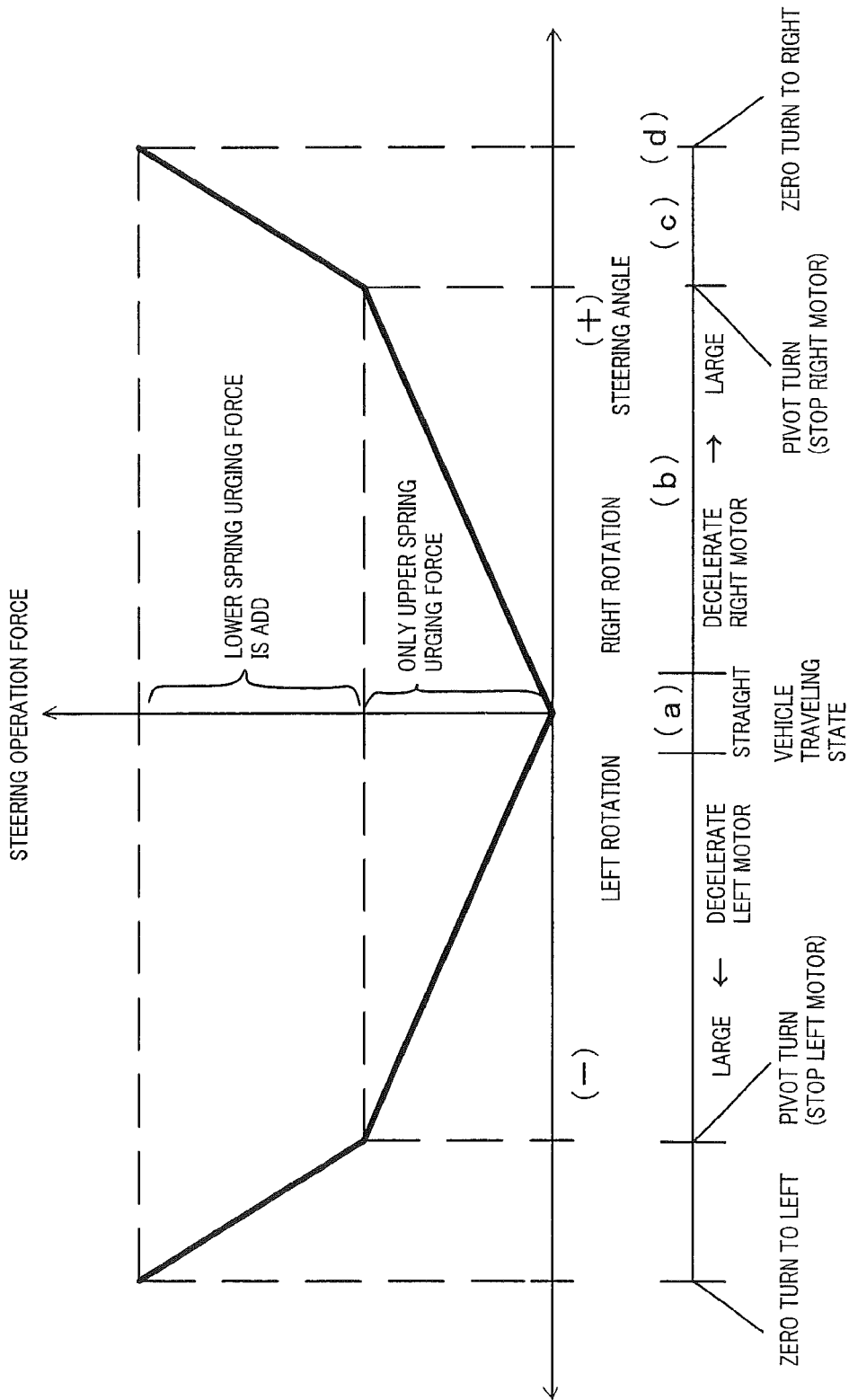
FIG. 23 is a diagram showing the relationship between a steering operation force and a steering angle, which shows that an increase degree of the steering operation force changes with a predetermined steering angle threshold value as a boundary when the steering operator is rotated in the fifth embodiment.

FIG. 19 is a perspective view showing the lawnmower vehicle 10, which is a riding-type ground working vehicle of a fifth embodiment according to the present invention. FIG. 20 is a perspective view showing a rotation support structure of a steering operator provided in the lawnmower vehicle 10 of the fifth embodiment. FIG. 21 is an enlarged view showing a state in which an upper spring and a lower spring are removed, by cutting the A-A portion of FIG. 20. FIG. 22 is a view of FIG. 21 which shows a state of rotating the steering operator to one side from a neutral position in time sequence, and is seen from an upper side to a lower side, and is partially cut. FIG. 23 is a diagram showing the relationship between the steering operation force and the steering angle, which shows the increase degree of the steering operation force changes with a predetermined steering angle threshold value as a boundary when the steering operator is rotated, in the fifth embodiment.

As shown in FIG. 19, in the present embodiment, just as in the first embodiment illustrated in FIGS. 1 to 10 above, the lawnmower vehicle 10 is provided with the forward-travel side accelerator pedal 52 and the reverse-travel side accelerator pedal 54, and a brake pedal 149, at the upper side of the main frame 12 which serves as a vehicle body. A swing support portion of a link of each of the forward-travel side and reverse-travel side accelerator pedals 52 and 54 is disposed on a front side of a panel 150 at the front side when the vehicle is seen from the rear side, but may be disposed on a back side of the panel 150 at the front side.

A housing chamber 152 which houses an unillustrated controller and an unillustrated battery is provided in a range in a substantially U-shape, including both the left and right sides and the rear side (right side of FIG. 19) of the driver's seat 46 at the upper side of the main frame 12, and an upper side of the housing chamber 152 is covered with a cover 154. The cover 154 can be made separately attachable and detachable by dividing the substantially U-shaped portion into a plurality of parts.

A support section 156 configured by a metal plate or the like such as a steel plate is vertically provided at a front part of the main frame 12 (left part of FIG. 19), and a steering box 158 is fixed to an upper side of a central portion in the lateral direction of the support section 156. The steering operator 50 is rotatably supported at the steering box 158, and the steering angle thereof can be detected by the steering angle sensor 56 (FIG. 20). Next, based on FIG. 20 and the like, a rotation support structure of the steering operator 50 is described in detail.

FIG. 20 is a view showing the steering operator 50 with the steering box 158 removed, and the steering operator 50 includes a circular rim portion, a radial spoke portion connected to the rim portion, and a steering shaft portion 160 connected to a center portion of the spoke. A support frame 162 is fixed to an upper side of the support section 156 (FIG. 19), and an upper side bearing support portion 164 and a lower side bearing support portion 166, which are respectively called bearing stays and are fixed portions fixed to the main frame 12, are provided at one side (left side of FIG. 20) of an upper end portion of the support frame 162 so as to be vertically separated.

The support frame 162 may be fixed to the main frame 12 (FIG. 19) without the support section 156 (FIG. 19) interposed therebetween. The upper side and lower side bearing support portions 164 and 166 are provided with bearings therein respectively, and rotatably support the steering shaft portion 160 at two portions by the respective bearings. For example, as shown in FIG. 21, a bearing 168 such as a ball bearing is provided around the steering shaft portion 160, and the steering shaft portion 160 is rotatably supported at the upper side bearing support portion 164 (FIG. 20) by the bearing 168.

Further, the steering angle sensor 56 is provided at a lower end portion of the steering shaft portion 160. In the case of this example, the steering angle sensor 56 has its casing fixed to a lower side of the lower side bearing support portion 166 as a potentiometer. Further, a sensor of the steering angle sensor 56 is connected to a lower end portion of the steering shaft portion 160, and the steering angle of the steering operator 50 (FIG. 20) can be detected by the steering angle sensor 56. The detection signal from the steering angle sensor 56 is taken out by a cable 170 to be input in an unillustrated controller. As the steering angle sensor 56, there can be used an electric sensor such as an encoder, an optical sensor, and the like other than a potentiometer. The steering angle sensor 56 can be provided on another member which is linked to the steering shaft portion 160, or a peripheral portion thereof, other than the lower end portion of the steering shaft portion 160.

As shown in FIG. 20, a swing arm 172 is fixed between the respective upper side and lower side bearing support portions 164 and 166 of the steering shaft portion 160. As shown in FIG. 21, the swing arm 172 includes a main body portion 174 formed into the shape of a substantially rhombic flat plate, and a first upper side locking pin 176 and a butting pin 178 which are fixed to both end portions of the main body portion 174 to project to the lower side. The swing arm 172 swings in the same direction as the rotating direction of the steering shaft portion 160 with the rotation of the steering shaft portion 160 integrally with the steering shaft portion 160.

Further, a loose-fit arm 180 is loosely fitted to the steering shaft portion 160 between the swing arm 172 and the lower side bearing support portion 166. More specifically, the loose-fit arm 180 is fitted on and supported by the steering shaft portion 160 to be relatively rotatable. A bearing such as a ball bearing can be provided between the steering shaft portion 160 and the loose-fit arm 180. The loose-fit arm 180 is formed into a side larger than the swing arm 172. The loose-fit arm 180 is in a plate shape as a whole, and includes a main body portion 182 having a shape in which a semi-circular portion 192 is connected to an angle portion 190, a first lower side locking pin 184 and a second upper side locking pin 186 fixed to the main body portion 182, and a stopper 188 provided at the upper side of the main body portion 182. More specifically, the first lower side locking pin 184 is fixed to the top portion of the angle portion 190 of the loose-fit arm 180 to project to the lower side. The lower ends of the first upper side locking pin 176 and the butting pin 178 of the swing arm 172 are opposed to the top surface of the loose-fit arm 180. Further, the second upper side locking pin 186 projected upward is fixed to an intermediate portion of the angle portion 190.

Further, as shown in FIG. 22, a pair of stoppers 188 are provided at both sides of the semi-circular portion 192 of the loose-fit arm 180. Each of the stoppers 188 is configured by connecting a bolt to a thread hole of a support portion 194 fixed to the semi-circular portion 192, and projecting a tip end portion of the bolt from the end surface of the support portion 194. Further, by connecting an anti-loosening nut 196 to the bolt, and pressing the anti-loosening nut 196 against the support portion 194, accidental change of the tip end projection amount of the bolt is inhibited. Thereby, the projection amount of the tip end portion of the bolt from the end surface of the support portion 194 is adjusted, and the state after adjustment can be kept. The tip end surface of each of the bolts can be butted to the butting pin 178 fixed to the swing arm 172.

For example, the butting pin 178 is butted to the stopper 188 when the absolute value of the rotation angle of the steering shaft portion 160 from the neutral position (position shown in FIG. 22(a)) of the steering shaft portion 160 becomes a predetermined value (for example, 80 degrees) which is set in advance, or more. A butting mechanism 198 is configured by the butting pin 178 and the stopper 188. Such a butting mechanism 198 is provided between the swing arm 172 and the loose-fit arm 180, and only when the swing amount of the swing arm 172 from the position of (a) of FIG. 22, which is the neutral position, is a predetermined amount which is set in advance or more, the swing arm 172 is butted to the loose-fit arm 180 to swing the loose-fit arm 180 integrally with the swing arm 172 in the same direction as the swing arm 172.

Further, as shown in FIG. 21, a fixed member 200 is fixed to an upper side of the lower side bearing support portion 166 which supports the lower end portion of the steering shaft portion 160, and a tip end surface of the first lower side locking pin 184 of the loose-fit arm 180 is opposed to a top surface of a fixed plate 202 provided at the fixed member 200. Further, a second lower side locking pin 204 is fixed to the fixed plate 202 to project upward. The steering shaft portion 160 is fitted in a hole portion provided in the fixed member 200. All of the first upper side and lower side locking pins 176 and 184, the second upper side and lower side locking pins 186 and 204, and the butting pin 178 extend in the direction parallel with the steering shaft portion 160.

Further, an upper spring 206, which is a first spring, is loosely fitted on the steering shaft portion 160 between the swing arm 172 and the loose-fit arm 180. The upper spring 206 has a pair of leg portions 208, which are both end portions of a coil spring extended in a substantially parallel direction, and is disposed so that a main body portion of the upper spring 206 is loosely fitted on the steering shaft portion 160, and the first upper locking pin 176 of the swing arm 172 and the second upper locking pin 186 of the loose-fit arm 180 are inserted in the inside of a pair of the leg portions 208. Thereby, for example, as shown in (a) to (c) of FIG. 22, when the steering shaft portion 160 is rotated in either direction, the swing arm 172 swings relative to the loose-fit arm 180, and therefore, the space between the first upper locking pin 176 and the second upper locking pin 186 is enlarged, and the space between a pair of the leg portions 208 pressed by the locking pins 176 and 186 is enlarged. In this case, the urging force, which is an elastic force in the direction to reduce the space between a pair of leg portions 208, is applied to the upper side locking pins 176 and 186 from a pair of leg portions 208. Therefore, in order to rotate the steering shaft portion 160 by the operation force, it is necessary to apply the operation force which runs against the urging force of the upper spring 206. More specifically, the upper spring 206 gives to the swing arm 172 the urging force which becomes larger as the swing amount of the swing arm 172 to the loose-fit arm 180 increases. FIG. 22 shows the case of rotating the steering operator 50 (FIG. 20) gradually to the right, but when the steering shaft portion 160 is rotated in the opposite direction to the state from (a) to (c) of FIG. 22; that is, when the steering operator 50 is rotated to the left, the same concept applies, except that the left and right sides of the leg portions 208 pressed by the upper side locking pins 176 and 186 become opposite.

Further, as shown in FIG. 21, a lower spring 210, which is a second spring, is loosely fitted on the steering shaft portion 160 between the loose-fit arm 180 and the lower side bearing support portion 166. The lower spring 210 has a pair of leg portions 212 which are both end portions of the coil spring extended in substantially parallel directions, and a main body portion of the lower spring 210 is loosely fitted on the steering shaft portion 160, which is similar to the upper spring 206. With this, the lower spring 210 is disposed so that the first lower side locking pin 184 of the loose-fit arm 180 and the second lower side locking pin 204 provided at the fixed plate 202 are inserted in the inside of a pair of the leg portions 212. The length of the leg portion 212 of the lower spring 210 is made longer than the length of the leg portion 208 of the upper spring 206, and the urging force of the lower spring 210 is made larger than the urging force of the upper spring 206.

Thereby, for example, as shown in (a) and (b) of FIG. 22, when the absolute value of the rotation angle from the neutral position of the steering shaft portion 160 is less than a predetermined angle (For example, 80 degrees), the urging force of the upper spring 206; that is, the resistant force based on the elastic force, and the resistance force based on the elastic force of the lower spring 210 act as the resistance force against swinging the steering shaft portion 160 relative to the fixed plate 202 (FIG. 21 and the like), and the elastic force of the lower spring 210 is larger than the elastic force of the upper spring 206. As a result, the positional relationship of the second lower side locking pin 204 provided at the fixed plate 202 and the loose-fit arm 180 does not change. Therefore, the elastic force of the upper spring 206 which increases in response to the swing displacement of the swing arm 172 relative to the loose-fit arm 180 acts on the steering shaft portion 160 as the increasing resistance force to the operation force of the steering shaft portion 160. However, as shown in (c) of FIG. 22, when the absolute value of the rotation angle of the steering shaft portion 160 becomes a predetermined angle (for example, 80 degrees), the butting pin 178 of the swing arm 172 is butted to the stopper 188, and when the steering shaft portion 160 is further rotated as shown in (d) of FIG. 22, the swing arm 172 and the loose-fit arm 180 are integrally rotated. In this case, the loose-fit arm 180 swings relative to the second lower side locking pin 204 fixed to the fixed plate 202, the space between the first lower side locking pin 184 and the second lower side locking pin 204 is enlarged, and the space between a pair of leg portions 212 pressed by these locking pins 184 and 204 is enlarged. Accordingly, the elastic force of the lower spring 210 without inclusion of the upper spring 206 directly acts on swinging of the swing arm 172 relative to the second lower side locking pin 204 fixed to the fixed plate 202 as the increasing resistance force. The second urging force, which is the elastic force of the lower spring 210, is the force which acts on a pair of leg portions 212 in the direction to reduce the space between a pair of leg portions 212. Therefore, in order to rotate the steering shaft portion 160, application of the operation force which runs against the second urging force that is the elastic force of the lower spring 210 is needed. More specifically, the elastic force of the lower spring 210, which increases in response to the swing displacement of the loose-fit art 180 relative to the second lower side locking pin 204; that is, the elastic force of the lower spring larger than the elastic force of the upper spring 206, acts on the steering shaft portion 160 as the increasing resistance force to the operation force of the steering shaft portion 160. More specifically, the lower spring 210 applies the second urging force which becomes larger with increase in the swing amount from the neutral position of the loose-fit arm 180; that is, increase in the swing amount relative to the second lower locking pin 204 to the loose-fit arm 180.

According to the present embodiment as described above, the steering operation force necessary for operating; that is, rotating the steering operator 50, can be made larger with increase in the absolute value of the steering angle from the neutral position, and the degree of the increase of the operating force with respect to the increase in the absolute value of the steering angle can be increased with a certain steering angle threshold value as a boundary. Further, in order to obtain the effect, complicated control does not have to be used, and setting of the steering angle threshold value can be easily adjusted.

FIG. 23 is a diagram showing one example of the relationship between the steering angle in the lateral direction of the steering operator and the steering operation force. In the following description, the same components as the components shown in FIGS. 19 to 21 are assigned the same reference numerals. Further, the traveling state of the vehicle and deceleration state of the electric motor for vehicle are shown at the lower side of FIG. 23. (a) to (d) shown in the lower side portion of FIG. 23 correspond to (a) to (d) of the above-described FIG. 22. The x axis of FIG. 23 represents the steering angle, and the steering angle in the case of rotation to the left side from a minus side output of the steering angle sensor 56 can be obtained, and the steering angle in the case of rotation to the right side from a plus side output of the steering angle sensor 56 can be obtained. Accordingly, the x axis of FIG. 23 can be expressed as the plus side output and the minus side output of the steering angle sensor 56.

In the example of FIG. 23, for example, when the steering operator 50 is rotated to the right from the straight traveling state of the vehicle, the deceleration amount of the electric motor 24 for right wheel (see FIG. 1, and the like) becomes gradually larger. In this case, only the urging force of the upper spring 206 of the upper spring 206 and the lower spring 210 is applied to the steering operator 50. When the electric motor 24 for right wheel stops, pivot turn, in which the vehicle turns around the ground contact position of the right wheel 20 (see FIG. 1 and the like), is performed. In this state, as shown in (c) of FIG. 22, the butting pin 178 is butted to the stopper 188 at one side. When the steering operator 50 is further rotated to the right from this state, as shown in FIG. 23, the second urging force of the lower spring 210 is applied to the urging force of the upper spring 206, and the degree of the increase in the steering operation force relative to the increase in the rotation angle of the steering operator 50 becomes larger, and the operation force of the steering operator 50 abruptly becomes larger (becomes heavier). The rotation torque in the opposite direction to the electric motor 22 for the left wheel (see FIG. 1 and the like) occurs at the electric motor 24 for right wheel, and in the state in which the rotational speeds of both the electric motors 24 and 22 are the same and the rotational directions are opposite each other, stationary turn, which is called zero turn, in the clockwise direction is performed.

Further, when the steering operator 50 is rotated to the left from the straight traveling state of the vehicle, the deceleration amount of the electric motor 22 for the left wheel (see FIG. 1 and the like) becomes gradually larger, and this case is the same as the aforementioned description, except that the left and the right are reversed. The other configuration and operation are the same as in the first embodiment shown in the above-described FIGS. 1 to 10. In the present embodiment, the degree of increase of the operation force relative to the increase in the absolute value of the steering angle of the steering operator 50 is switched in the two levels, but it can be switched in a three or more levels.

What is claimed is:

1. A riding-type ground working vehicle comprising:
   left and right wheels which are main drive wheels independently driven to travel by two respective traction motors,
   steering control wheels provided separately in a longitudinal direction with respect to the left and right wheels, and
   a working machine that is driven to perform ground work,
   the riding-type ground working vehicle further comprising:
   command value calculating section that calculates two target rotational speed command values of the two respective traction motors based on an acceleration instruction and a turn instruction input by a driver;
   yaw rate detecting section that detects a yaw rate of the vehicle;
   target yaw rate calculating section that calculates a target yaw rate based on the acceleration instruction and the turn instruction;
   correction coefficient acquiring section that acquires two correction coefficients relating to the two respective traction motors based on a deviation between the target yaw rate and a yaw rate detection value; and
   control section that corrects the two target rotational speed command values by the two correction coefficients, and controls driving of the two traction motors based on the two corrected target rotational speed command values.

2. The riding-type ground working vehicle according to claim 1,
   wherein the two traction motors are electric motors,
   the riding-type ground working vehicle further comprising two rotational speed detecting section that detect rotational speeds of the two traction motors,
   wherein the control section calculates torque command values for the respective traction motors based on a deviation between the two target rotational speed command values after being corrected by the correction coefficients, and rotational speed detection values of the two motors, and controls the driving of the two traction motors by the respective torque command values.

3. The riding-type ground working vehicle according to claim 1,
   wherein the two traction motors are hydraulic motors,
   the riding-type ground working vehicle further comprising one or two actuators capable of discharging pressure oil respectively independently to the two traction motors from at least two discharge ports, and capable of changing discharge amounts of the pressure oil discharged from the two discharge ports; and
   two rotational speed detecting section that detect rotational speeds of the two traction motors,
   wherein the control section controls the driving of the two traction motors by changing the discharge amounts of the pressure oil discharged from the two discharge ports based on a deviation between the two target rotational speed command values after being corrected by the correction coefficients, and rotational speed detection values of the two traction motors.

4. The riding-type ground working vehicle according to claim 3, further comprising:
   an actuator power source that drives the actuator,
   wherein the one or two actuators are actuators that include two control shafts, and two control shaft motors that are operatively connected to the two control shafts and change rotation angles of the two control shafts, in which the rotational angles of the two control shafts are changed, and thereby, the discharge amounts of the pressure oil discharged from the two discharge ports corresponding to the two respective control shafts change, and
   the control section calculates rotation angle command values for the two control shafts based on a deviation between the two target rotational speed command values after being corrected by the correction coefficients, and the rotational speed detection values of the two traction motors, controls the drive of the two control shaft motors by the respective rotation angle command values, and thereby, controls the drive of the two traction motors.

5. The riding-type ground working vehicle according to claim 1,
   wherein the correction coefficient acquiring section includes
   a calculation section that performs calculation including PI calculation based on a deviation between the target yaw rate and the yaw rate detection value, and
   a main correction coefficient acquiring section that acquires two correction coefficients corresponding to the two target rotational speed command values from output of the calculation section, and
   the main correction coefficient acquiring section sets one correction coefficient, of the two correction coefficients, at a fixed value, and decreases or increases the other correction coefficient when the output of the calculation section increases, and sets the other correction coefficient, of the two correction coefficients, at a fixed value, and decreases or increases the one correction coefficient when the output of the calculation section decreases.

6. The riding-type ground working vehicle according to claim 1,
   wherein the correction coefficient acquiring section includes
   a calculation section that performs calculation including PI calculation based on a deviation between the target yaw rate and the yaw rate detection value, and
   a main correction coefficient acquiring section that acquires two correction coefficients corresponding to the two target rotational speed command values from output of the calculation section, and
   the main correction coefficient acquiring section sets one correction coefficient, of the two correction coefficients, at a fixed value which is a positive value, and decreases the other correction coefficient when the output of the calculation section increases, and sets the other correction coefficient, of the two correction coefficients, at a fixed positive value, and decreases the one correction coefficient when the output of the calculation section decreases, and further, changes the correction coefficient corresponding to one traction motor to a negative value from the positive value so as to generate drive torque in a reverse direction with respect to normal rotation corresponding to a traveling direction in the one traction motor of the two traction motors when an absolute value of the output of the calculation section is a predetermined value or more.

7. The riding-type ground working vehicle according to claim 1, comprising:

a pedal that is an acceleration operator capable of receiving an acceleration instruction; and a steering wheel that is a turn operator capable of receiving a turn instruction.

8. The riding-type ground working vehicle according to claim 1, comprising:

a two-lever-type operator capable of receiving instructions for the rotational speeds of the two traction motors corresponding to the left and right wheels as an acceleration instruction and a turn instruction, wherein the two-lever-type operator is capable of receiving an acceleration instruction and a turn instruction in concert with each other.

9. The riding-type ground working vehicle according to claim 1, wherein the steering control wheel is a caster wheel, or a mechanical steering type steering control wheel that is operatively connected to an operator, and can be steered by being linked to an operation of the operator.

10. The riding-type ground working vehicle according to claim 1, further comprising:

a fixed portion that rotatably supports a shaft portion provided at the operator capable of receiving a turn instruction, and is fixed to a vehicle body;

a swing arm that is fixed to the shaft portion and swings with rotation of the shaft portion;

a loose-fit arm that is loosely fitted on the shaft portion between the swing arm and the fixed portion;

a butting mechanism that is provided between the swing arm and the loose-fit arm, makes the swing arm butt against the loose-fit arm to swing the loose-fit arm in the same direction as the swing arm integrally with the swing arm only when a swing amount from a neutral position of the swing arm is a predetermined amount set in advance or more;

a first spring that is provided between the swing arm and the loose-fit arm, and gives to the swing arm an urging force, which becomes larger with an increase in the swing amount of the swing arm with respect to the loose-fit arm; and a second spring that is provided between the loose-fit arm and the fixed portion, and gives to the loose-fit arm a second urging force, which becomes larger with an increase of a swing amount of the loose-fit arm with respect to the fixed portion.

* * * * *